United States Patent
Ishii et al.

(12)

(10) Patent No.: US 11,264,890 B2
(45) Date of Patent: Mar. 1, 2022

(54) POWER SUPPLY PROTECTION CIRCUIT

(71) Applicant: PANASONIC CORPORATION, Osaka (JP)

(72) Inventors: Takuya Ishii, Osaka (JP); Tetsuya Mihashi, Kyoto (JP); Ginga Katase, Kyoto (JP); Takashi Ryu, Kyoto (JP)

(73) Assignee: NUVOTON TECHNOLOGY CORPORATION JAPAN, Kyoto (JP)

( * ) Notice: Subject to any disclaimer, the term of this patent is extended or adjusted under 35 U.S.C. 154(b) by 0 days.

(21) Appl. No.: 16/859,848

(22) Filed: Apr. 27, 2020

(65) Prior Publication Data
US 2020/0259410 A1 Aug. 13, 2020

Related U.S. Application Data

(63) Continuation of application No. PCT/JP2018/039931, filed on Oct. 26, 2018.

(30) Foreign Application Priority Data

Oct. 30, 2017 (JP) .............................. JP2017-209739

(51) Int. Cl.
*H02M 1/32* (2007.01)
*H02H 7/20* (2006.01)
(Continued)

(52) U.S. Cl.
CPC ............... *H02M 1/32* (2013.01); *H02H 1/00* (2013.01); *H02H 3/20* (2013.01); *H02H 7/20* (2013.01);
(Continued)

(58) Field of Classification Search
CPC .. H02M 1/32; H02H 7/20; H02H 3/20; H02H 1/00; H02H 3/08; H02H 9/02; H02H 7/10; G05F 1/10
(Continued)

(56) References Cited

U.S. PATENT DOCUMENTS 5,212,606 A * 5/1993 Park ..................... G11B 31/006
360/99.02
8,000,072 B2 * 8/2011 Bauer .................... H02H 3/046
361/87
(Continued)

FOREIGN PATENT DOCUMENTS

JP         06-086460         3/1994

OTHER PUBLICATIONS

International Search Report issued in corresponding International Patent Application No. PCT/JP2018/039931, dated Nov. 27, 2018, with English translation.
(Continued)

*Primary Examiner* — Danny Nguyen
(74) *Attorney, Agent, or Firm* — McDermott Will & Emery LLP

(57) ABSTRACT

A power supply protection circuit is a circuit that controls a protection switch provided on a power supply line connecting a direct current power supply and a load circuit. The power supply protection circuit includes: circuitry connected to the protection switch; and a controller that switches an operation state of the circuitry between a first state and a second state. The first state is an operation state in which driving of the protection switch is enabled when the protection switch is a first semiconductor switch having a control terminal connected to a semiconductor layer of a first conductivity type. The second state is an operation state in which driving of the protection switch is enabled when the protection switch is a second semiconductor switch having a control terminal connected to a semiconductor layer of a second conductivity type that is different from the semiconductor layer of a first conductivity type.

16 Claims, 26 Drawing Sheets

(51) Int. Cl.
  *H02H 3/20* (2006.01)
  *H02H 1/00* (2006.01)
  *H02H 9/02* (2006.01)
  *H02H 3/08* (2006.01)
  *G05F 1/10* (2006.01)
(52) U.S. Cl.
  CPC .............. *G05F 1/10* (2013.01); *H02H 3/08* (2013.01); *H02H 9/02* (2013.01)
(58) Field of Classification Search
  USPC .................................. 361/86–87, 93.7–93.9
  See application file for complete search history.

(56) References Cited

U.S. PATENT DOCUMENTS

| | | | |
|---|---|---|---|
| 8,542,472 B2* | 9/2013 | Mullins ................ | H01R 24/60 |
| | | | 361/86 |
| 2013/0314830 A1* | 11/2013 | Zamprogno .......... | H02H 3/207 |
| | | | 361/86 |

OTHER PUBLICATIONS

International Search Report issued in corresponding International Patent Application No. PCT/JP2018/039931, dated Oct. 26, 2018, with English translation.

* cited by examiner

|  | 41a | 42a | 43a | 44a | 45a |
|---|---|---|---|---|---|
| N_normal | off | Clk | Clk | /Clk | off |
| N_abnormal | off | off | off | on | on |
| P_normal | on | off | off | off | off |
| P_abnormal | off | on | off | off | off |

|             | 41b | 42b | 43b  | 44b | 45b  |
|-------------|-----|-----|------|-----|------|
| N_normal    | off | Clk | /Clk | Clk | /Clk |
| N_abnormal  | off | on  | off  | on  | off  |
| P_normal    | on  | on  | off  | off | off  |
| P_abnormal  | off | on  | on   | off | off  |

|  | 41c | 42c | 43c | 44c | 45c |
|---|---|---|---|---|---|
| N_normal | Clk | /Clk | on | /Clk | off |
| N_abnormal | off | off | off | off | on |
| P_normal | on | off | on | off | off |
| P_abnormal | on | on | on | off | off |

|  | 41d | 42d | 43d | 44d | 45d |
|---|---|---|---|---|---|
| N_normal | off | off | on | on | /CH |
| N_abnormal | off | on | off | on | off |
| P_normal | on | on | off | off | off |
| P_abnormal | off | off | on | off | off |

POWER SUPPLY PROTECTION CIRCUIT

CROSS REFERENCE TO RELATED APPLICATIONS

This application is a U.S. continuation application of PCT International Patent Application Number PCT/JP2018/039931 filed on Oct. 26, 2018, claiming the benefit of priority of Japanese Patent Application Number 2017-209739 filed on Oct. 30, 2017, the entire contents of which are hereby incorporated by reference.

BACKGROUND

1. Technical Field

The present disclosure relates to a power supply protection circuit.

2. Description of the Related Art

A power supply protection circuit according to a conventional technique is known in which a protection switch is provided between a direct current power supply and a load circuit, and the protection switch is shut down when an anomaly in the load circuit is detected. Such a power supply protection circuit will be described with reference to FIGS. 30 and 31.

FIG. 30 is a circuit diagram showing a schematic configuration of a power supply protection circuit according to a conventional technique. As shown in FIG. 30, the power supply protection circuit is provided on a power supply line connecting direct current power supply 801 and load circuit 803. The power supply protection circuit includes protection switch 802 and control circuit 804. Control circuit 804 renders protection switch 802 conductive and transmits power from direct current power supply 801 to load circuit 803 during normal operations. Also, when control circuit 804 detects an anomaly based on information from load circuit 803, control circuit 804 shuts down protection switch 802, thereby stopping the supply of power from direct current power supply 801. By doing so, further damage to load circuit 803 can be prevented, and direct current power supply 801 can be protected.

FIG. 31 is a circuit diagram showing a configuration of a power supply protection circuit according to a conventional technique disclosed in Japanese Unexamined Patent Application Publication No. H6-86460. Power supply device 901 shown in FIG. 31 includes direct current power supply 902, circuit block 906 that serves as a load circuit, control block 903 that constitutes the power supply protection circuit, first switch circuit 904, and second switch circuit 905. First switch circuit 904 includes transistor 941 and resistors 942 and 944. Second switch circuit 905 includes transistor 951, a circuit that includes resistors 952 and 953, a parallel circuit that includes diode 957 and capacitor 956, and feedback resistor 954.

Control block 903 shown in FIG. 31 sets on/off control signal 934 to H level (or in other words, HIGH level) at the time of activation. As a result, charging current i12 flows through capacitor 956 to turn on transistor 951, and base current i11 of transistor 941 flows to turn on first switch circuit 904. During normal operations, voltage is generated in power supply line 906A, and current i13 flows via feedback resistor 954. Even if charging current i12 stops flowing as a result of capacitor 956 being fully charged, transistor 941 of first switch circuit 904 is kept turned on, and power is supplied to circuit block 906.

At the time of an anomaly, if power supply line 906A is shorted with the grounding line, because first switch circuit 904 is kept turned on during the period in which charging current i12 of capacitor 956 is flowing, an overcurrent flows through first switch circuit 904. However, because feedback current i13 does not flow, when charging current i12 stops flowing, transistor 951 is turned off, and first switch circuit 904 is turned off.

SUMMARY

In the power supply protection circuit according to a conventional technique shown in FIGS. 30 and 31, a PNP transistor (or Pch MOSFET) is used as the protection switch. However, a NPN transistor (or Nch MOSFET) may be used. In general, if a PNP transistor (or Pch MOSFET) and a NPN transistor (or Nch MOSFET) have the same shape, the NPN transistor (or Nch MOSFET) can have a lower conduction voltage when turned on, but it is problematic in that a voltage higher than the power supply voltage is required as the driving voltage, which requires a complex driving circuit. The designer has to select an appropriate device for the protection switch according to the required performance and the target price.

It is an object of the present disclosure to provide a power supply protection circuit in which a protection switch can be selected from a wide variety of devices, and ease of design can be achieved.

In order to achieve the above-described object, a power supply protection circuit according to one aspect of the present disclosure is a power supply protection circuit that controls a protection switch provided on a power supply line connecting a direct current power supply and a load circuit, the power supply protection circuit including: circuitry connected to the protection switch; and a controller that switches an operation state of the circuitry between a first state and a second state, wherein the first state is an operation state in which driving of the protection switch is enabled when the protection switch is a first semiconductor switch having a control terminal connected to a semiconductor layer of a first conductivity type, and the second state is an operation state in which driving of the protection switch is enabled when the protection switch is a second semiconductor switch having a control terminal connected to a semiconductor layer of a second conductivity type that is different from the semiconductor layer of a first conductivity type.

According to the present disclosure, it is possible to provide a power supply protection circuit in which a protection switch can be selected from a wide variety of devices, and ease of design can be achieved.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 1 FIG. 1C is an overall circuit diagram of a power supply protection circuit according to Embodiment 1;

DETAILED DESCRIPTION OF THE EMBODIMENTS

Hereinafter, power supply protection circuits according to embodiments will be described with reference to the drawings.

A power supply protection circuit according to the present embodiment is a power supply protection circuit that controls a protection switch provided on a power supply line connecting a direct current power supply and a load circuit, the power supply protection circuit including: circuitry connected to the protection switch; and a controller that switches an operation state of the circuitry between a first state and a second state, wherein the first state is an operation state in which driving of the protection switch is enabled when the protection switch is a first semiconductor switch having a control terminal connected to a semiconductor layer of a first conductivity type, and the second state is an operation state in which driving of the protection switch is enabled when the protection switch is a second semiconductor switch having a control terminal connected to a semiconductor layer of a second conductivity type that is different from the semiconductor layer of a first conductivity type.

Also, in the diagrams, as protection switches, a Pch MOSFET is used as a typical example of a first semiconductor switch having a control terminal connected to a semiconductor layer of a first conductivity type, and a Nch MOSFET is used as a typical example of a second semiconductor switch having a control terminal connected to a semiconductor layer of a second conductivity type.

Figure 1A:
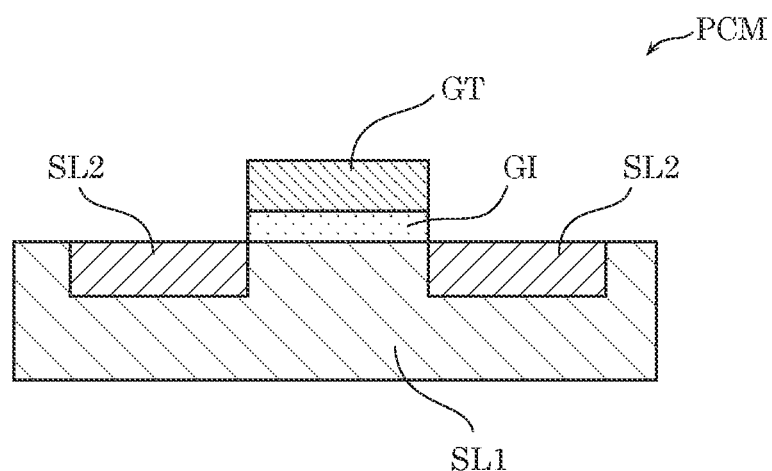
FIG. 1A and FIG. 1B are cross-sectional views schematically illustrating a configuration of first semiconductor switch PCM according to the present disclosure and a configuration of second semiconductor switch NCM according to the present disclosure, respectively.
Figure 1B:
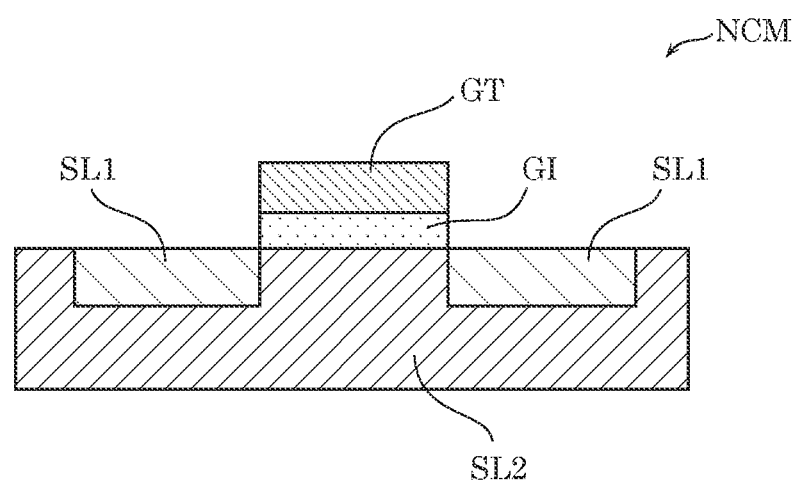

A configuration example of the first semiconductor switch and a configuration example of the second semiconductor switch will be described with reference to FIG. 1A and FIG. 1B, respectively. FIG. 1A and FIG. 1B are cross sectional views schematically illustrating a configuration of first semiconductor switch PCM according to the present disclosure and a configuration of second semiconductor switch NCM according to the present disclosure, respectively.

First semiconductor switch PCM illustrated in FIG. 1A is a Pch MOSFET, and includes semiconductor layer of first conductivity type SL1, semiconductor layer of second conductivity type SL2, insulating layer GI, and control terminal GM. As illustrated in FIG. 1A, control terminal GM of first semiconductor switch PCM is a gate terminal of the Pch MOSFET, and is connected to semiconductor layer of first conductivity type SL1 via insulating layer GI.

Second semiconductor switch NCM illustrated in FIG. 1B is a Nch MOSFET, and includes semiconductor layer of first conductivity type SL1, semiconductor layer of second conductivity type SL2, insulating layer GI, and control terminal GM. As illustrated in FIG. 1B, control terminal GM of second semiconductor switch NCM is a gate terminal of the Nch MOSFET, and is connected to semiconductor layer of second conductivity type SL2 via insulating layer GI.

In the example shown in FIG. 1A and FIG. 1B, the first conductivity type is an N type, and the second conductivity type is a P type.

Note that the embodiments described below show specific examples of the present disclosure. Accordingly, the numerical values, shapes, materials, structural elements, the arrangement and connection of the structural elements, and the like shown in the embodiments are merely examples, and therefore are not intended to limit the scope of the present disclosure. Also, among the structural elements described in the following embodiments, structural elements not recited in any one of the independent claims are described as arbitrary structural elements.

Also, an excessively detailed description may be omitted. For example, a detailed description of already well-known matters and an overlapping description of substantially the same structural elements may be omitted or simplified. This is to avoid the following description from being unnecessarily lengthy and to facilitate the understanding of a person having ordinary skill in the art.

Also, the diagrams are not necessarily true to scale. In the diagrams, structural elements that are substantially the same are given the same reference numerals.

Embodiment 1

A power supply protection circuit according to Embodiment 1 will be described with reference to the drawings.

Figure 1C:
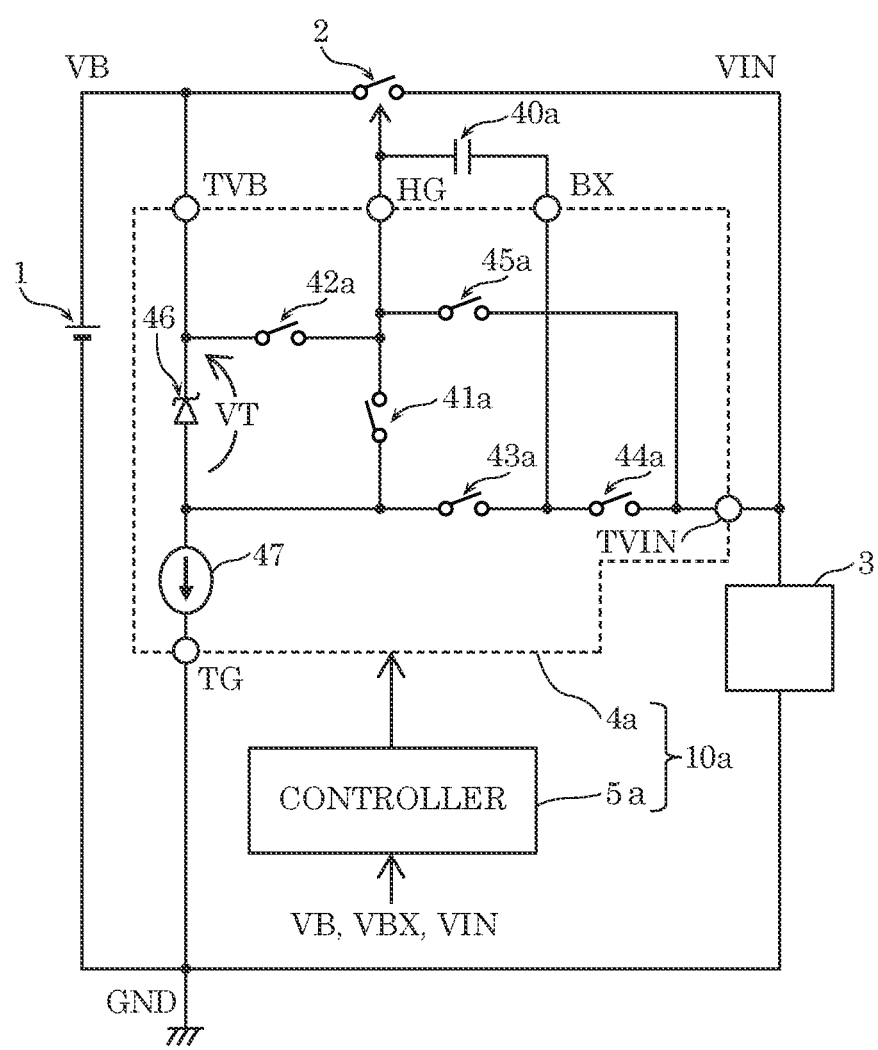

FIG. 1C is an overall circuit diagram of the power supply protection circuit according to Embodiment 1.

As shown in FIG. 1C, power supply protection circuit 10a is a circuit that controls protection switch 2 provided on a power supply line connecting direct current power supply 1 and load circuit 3. Power supply protection circuit 10a includes circuitry 4a that is connected to protection switch 2 and controller 5a that switches the operation state of circuitry 4a between a first state and a second state.

The first state of circuitry 4a is an operation state in which driving of protection switch 2 is enabled in the case where protection switch 2 is a first semiconductor switch having a control terminal connected to a semiconductor layer of a first conductivity type. The second state of circuitry 4a is an operation state in which driving of protection switch 2 is enabled in the case where protection switch 2 is a second semiconductor switch having a control terminal connected to a semiconductor layer of a second conductivity type that is different from the semiconductor layer of a first conductivity type. The following description will be given assuming that the semiconductor layer of a first conductivity type is a N type layer, and the semiconductor layer of a second conductivity type is a P type layer. As the first semiconductor switch having a control terminal connected to the semiconductor layer of a first conductivity type, for example, a P channel, a PNP type semiconductor switch, or the like can be used. As the second semiconductor switch having a control terminal connected to the semiconductor layer of a second conductivity type, for example, a N channel, a NPN type semiconductor switch, or the like can be used. Hereinafter, an example will be described in which a Pch MOSFET and a Nch MOSFET are used as the first semiconductor switch and the second semiconductor switch, respectively.

Circuitry 4a includes: a first power supply circuit that generates a first potential that is lower than power supply voltage VB that is a high potential side output voltage of direct current power supply 1 by an amount corresponding to a first driving voltage for driving the first semiconductor switch; a first driving circuit that applies the first potential to the control terminal of the protection switch in the first state; and a second driving circuit that applies a second driving voltage for driving the second semiconductor switch between the control terminal of the second semiconductor switch and a connection point between protection switch 2 and load circuit 3 in the second state.

Circuitry 4a includes: power supply terminal TVB that is connected to direct current power supply 1; driving terminal HG that is connected to the control terminal of protection switch 2; first terminal BX, load terminal TVIN that is connected to an output terminal of protection switch 2 and load circuit 3; and ground terminal TG that is connected to the ground potential.

In the present embodiment, circuitry 4a includes voltage supply 46, current supply 47, first switch 41a, second switch 42a, third switch 43a, fourth switch 44a, and fifth switch 45a. Also, circuitry 4a includes first capacitor 40a in the second state.

First capacitor 40a is an element for storing voltage, and is connected between first terminal BX and driving terminal HG.

Voltage supply 46 is a voltage generator that generates driving voltage VT for protection switch 2. In Embodiment 1, a Zener diode is used as voltage supply 46. As used herein, driving voltage VT refers to, in the case where, for example, the protection switch is a Nch MOSFET, a voltage that can drive the gate. Driving voltage VT is a voltage that is used to switch protection switch 2 between on and off, and is greater than or equal to a threshold voltage that is required to drive protection switch 2. In the present embodiment, the first driving voltage that is the driving voltage for driving the first semiconductor switch and the second driving voltage that is the driving voltage for driving the second semiconductor switch are both equal to driving voltage VT.

Voltage supply 46 is connected between power supply terminal TVB and current supply 47. A cathode terminal of voltage supply 46 is connected to power supply terminal TVB, and an anode terminal of voltage supply 46 is connected to current supply 47.

Current supply 47 is a circuit that outputs a constant current. Current supply 47 is connected between voltage supply 46 and ground terminal TG. A high potential side terminal of current supply 47 is connected to voltage supply 46, and a low potential side terminal of current supply 47 is connected to ground terminal TG.

A series circuit that includes voltage supply 46 and current supply 47 is connected to direct current power supply 1 and constitutes the first power supply circuit.

First switch 41a, second switch 42a, third switch 43a, fourth switch 44a, and fifth switch 45a are switching elements that are turned on and off by controller 5a. As first switch 41a, second switch 42a, third switch 43a, fourth switch 44a, and fifth switch 45a, for example, semiconductor switches such as MOSFETs can be used.

The first driving circuit includes: first switch 41a that is connected between the control terminal of protection switch 2 and a connection point between voltage supply 46 and current supply 47; and second switch 42a that is connected between direct current power supply 1 and the control terminal of protection switch 2.

The second driving circuit includes: a series circuit that includes first capacitor 40a and third switch 43a, the series circuit being connected in parallel to first switch 41a; fourth switch 44a that is connected between the output terminal (or in other words, load terminal TVIN) of protection switch 2 and first terminal BX, which is a connection point between first capacitor 40a and third switch 43a; and fifth switch 45a that is connected between the control terminal and the output terminal of protection switch 2.

Controller 5a switches the state of circuitry 4a by switching first switch 41a, second switch 42a, third switch 43a, fourth switch 44a, and fifth switch 45a of circuitry 4a between on and off based on power supply voltage VB of direct current power supply 1, first voltage VBX of first terminal BX, and output voltage VIN that is the voltage of the output terminal of protection switch 2. A detailed configuration of controller 5a will be given later.

Next, the operations of power supply protection circuit 10a performed when circuitry 4a is in the second state will be described with reference to FIGS. 2 to 4. Here, an example will be described in which protection switch 2 is a Nch MOSFET. Although not shown in FIGS. 2 to 4, a decision circuit of controller 5a that determines that protection switch 2 is a Nch MOSFET will be described later.

Figure 2:
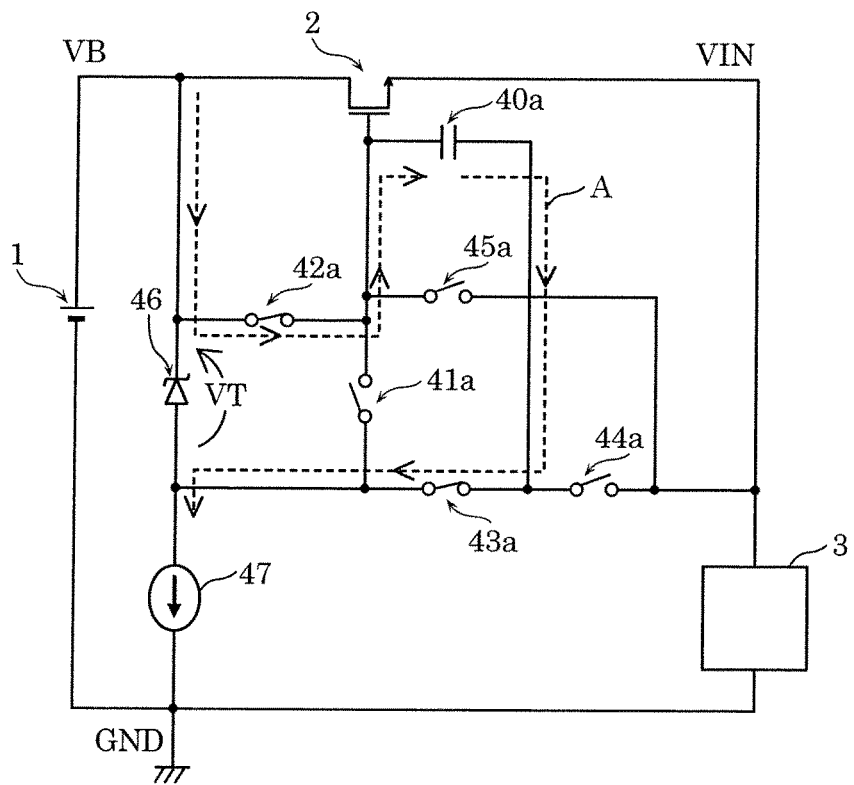
FIG. 2 is a diagram illustrating an operation of the power supply protection circuit according to Embodiment 1, in particular, a first normal operation of a Nch MOSFET.

FIG. 2 is a diagram illustrating an operation of power supply protection circuit 10a according to Embodiment 1, in particular, a first normal operation performed in the case where protection switch 2 is a Nch MOSFET. In the normal operation, first switch 41a and fifth switch 45a are fixed to off, second switch 42a and third switch 43a are repeatedly turned on and off in synchronization with each other, and fourth switch 44a is repeatedly turned on and off in an opposite phase to second switch 42a. The switching frequency of each switch is set to a high frequency of 100 kHz to several MHz. In the first normal operation shown in FIG. 2, second switch 42a and third switch 43a are turned on, and fourth switch 44a is turned off. At this time, an electric current flows as indicated by dotted arrow A shown in FIG. 2, and driving voltage VT is applied to first capacitor 40a. Driving voltage VT is a gate driving voltage that is generated by voltage supply 46 that is a Zener diode and is included in the first power supply circuit. At this time, power supply voltage VB is applied to the gate of protection switch 2, which is the control terminal of protection switch 2 that is a Nch MOSFET. If the source voltage of protection switch 2, or in other words, output voltage VIN of protection switch 2 is power supply voltage VB, there is no potential difference between the gate and the source, and thus protection switch 2 is turned off. Although not shown in the diagram, load circuit 3 includes a smoothing capacitor that is provided between load terminal TVIN and GND, and the smoothing capacitor stores a direct current voltage required to operate load circuit 3.

Figure 3:
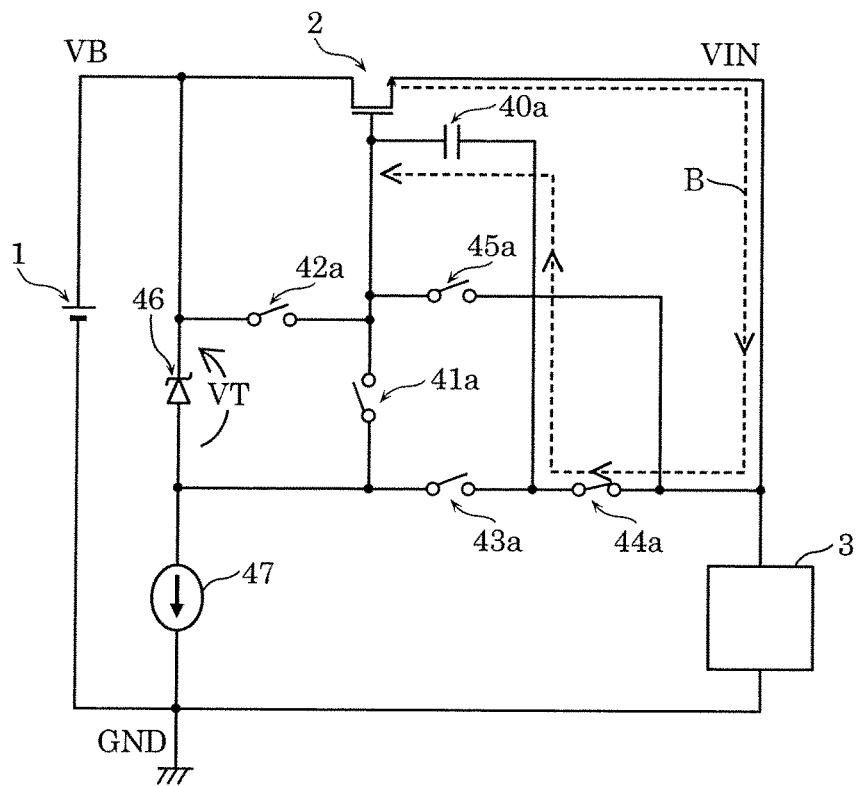
FIG. 3 is a diagram illustrating an operation of the power supply protection circuit according to Embodiment 1, in particular, a second normal operation of the Nch MOSFET.

FIG. 3 is a diagram illustrating an operation of the power supply protection circuit according to Embodiment 1, in particular, a second normal operation performed in the case where protection switch 2 is a Nch MOSFET.

In the second normal operation shown in FIG. 3, second switch 42a and third switch 43a are turned off, and fourth switch 44a is turned on. At this time, an electric current flows as indicated by dotted arrow B shown in FIG. 3, and the voltage of first capacitor 40a is applied between the gate and the source of protection switch 2. The voltage of first capacitor 40a is driving voltage VT that was described above, and protection switch 2 is turned on.

As described above, by repeating an operation of applying driving voltage VT to first capacitor 40a during the first normal operation and an operation of applying driving voltage VT of first capacitor 40a between the gate and the source of protection switch 2 during the second normal operation at a high frequency, protection switch 2 is repeatedly turned on and off at the high frequency. In the second normal operation, power is supplied from power supply voltage VB to load circuit 3 via protection switch 2, and the smoothing capacitor provided between load terminal TVIN and GND is charged with power supply voltage VB. Power supply voltage VB is constantly supplied to load circuit 3 in a stable manner. That is, during the normal operation, controller 5a turns off first switch 41a and fifth switch 45a, simultaneously turns on and off second switch 42a and third switch 43a at a predetermined cycle, and alternately turns on and off fourth switch 44a and second switch 42a so as to turn on and off protection switch 2. In order to save power, current supply 47 may stop operating.

Figure 4:
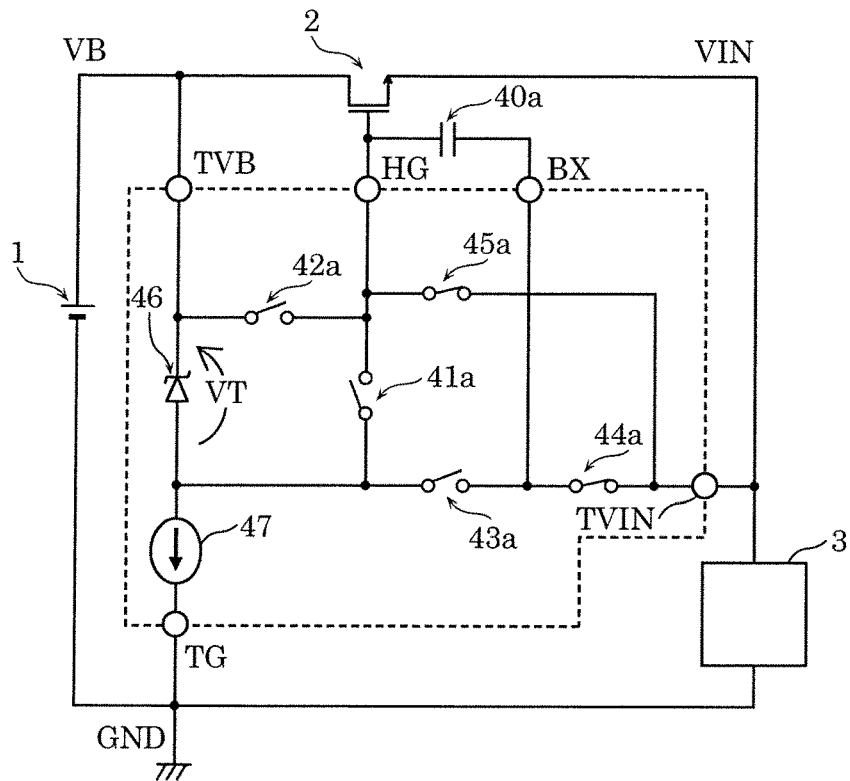
FIG. 4 is a diagram illustrating an operation of the power supply protection circuit according to Embodiment 1, in particular, a protection operation of the Nch MOSFET performed at the time of an anomaly.

FIG. 4 is a diagram illustrating an operation of the power supply protection circuit according to Embodiment 1, in particular, a protection operation of the Nch MOSFET performed at the time of an anomaly. Although not shown in the diagram, a circuit that detects an anomaly in load circuit 3 will be described later.

As shown in FIG. 4, if an anomalous state of load circuit 3 such as, for example, a state in which load terminal TVIN and GND have been short-circuited, or a state in which the impedance has been lowered is detected, controller 5a turns on fifth switch 45a. As a result, the gate and the source of protection switch 2 are short-circuited, and thus protection switch 2 is turned off. Also, fourth switch 44a is turned on so as to discharge first capacitor 40a. Also, first switch 41a, second switch 42a, and third switch 43a are turned off. As a result of protection switch 2 being turned off, the supply of power from direct current power supply 1 to load circuit 3 is shut down. That is, at the time of an anomaly, controller 5a turns off first switch 41a, second switch 42a, and third switch 43a, and turns on fourth switch 44a and fifth switch 45a so as to shut down protection switch 2. As a result, further damage to load circuit 3 can be prevented, and direct current power supply 1 can be protected. In order to save power, current supply 47 may stop operating.

Next, the operations of power supply protection circuit 10a performed when circuitry 4a is in the first state will be described with reference to FIGS. 5 and 6. Here, an example will be described in which protection switch 2 of power supply protection circuit 10a according to Embodiment 1 is a Pch MOSFET. In this case, it is unnecessary to provide first capacitor 40a shown in FIGS. 2 to 4. Also, in the first state, third switch 43a, fourth switch 44a, and fifth switch 45a are turned off by controller 5a, and first terminal BX, which is a connection point between third switch 43a and fourth switch 44a, is connected to power supply terminal TVB. Although not shown in FIGS. 5 and 6, a decision circuit of controller 5a that determines, based on the fact that first terminal BX is power supply voltage VB, that protection switch 2 is a Pch MOSFET will be described later.

Figure 5:
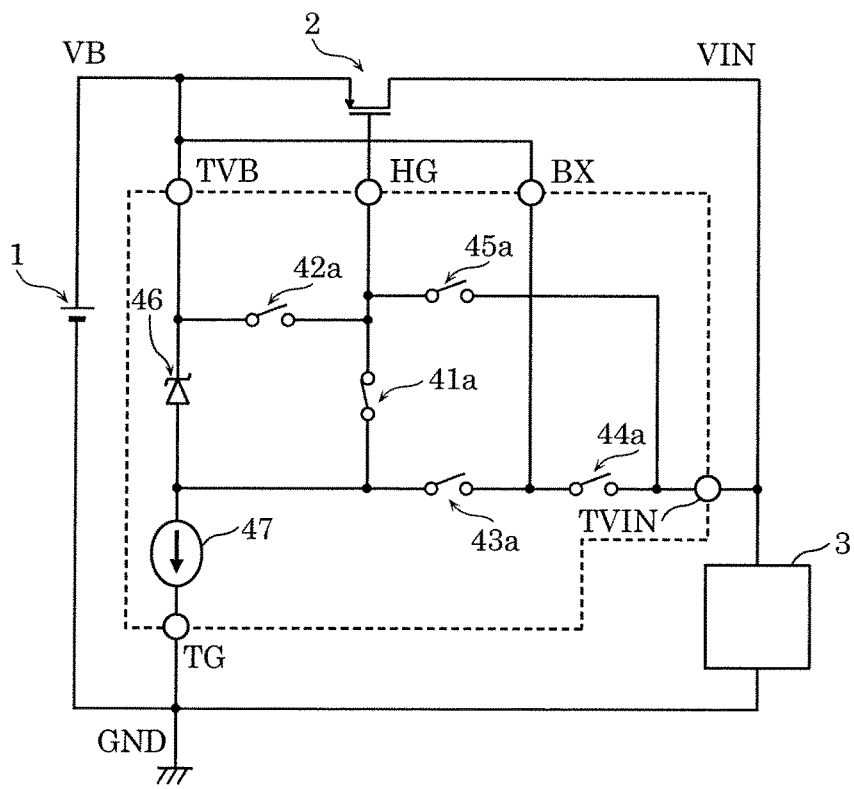
FIG. 5 is a diagram illustrating an operation of the power supply protection circuit according to Embodiment 1, in particular, a normal operation of a Pch MOSFET.

FIG. 5 is a diagram illustrating an operation of power supply protection circuit 10a according to Embodiment 1, in particular, a normal operation performed in the case where protection switch 2 is a Pch MOSFET.

As shown in FIG. 5, second switch 42a is turned off, and first switch 41a is turned on. At this time, a voltage lower than the source voltage by an amount corresponding to driving voltage VT is applied to the gate of protection switch 2 that is a Pch MOSFET, and thus protection switch 2 is constantly turned on. That is, during the normal operation, controller 5a turns on first switch 41a, and turns off second switch 42a, third switch 43a, fourth switch 44a, and fifth switch 45a so as to render protection switch 2 conductive. Because protection switch 2 is turned on, power supply voltage VB is supplied to load circuit 3 in a stable manner.

Figure 6:
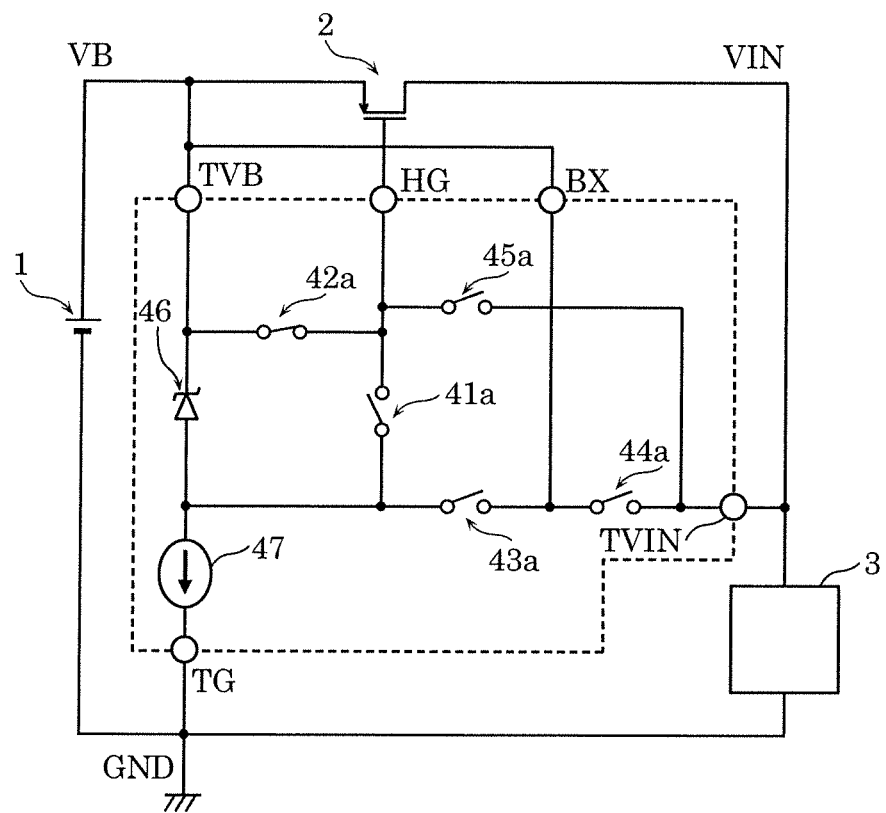
FIG. 6 is a diagram illustrating an operation of the power supply protection circuit according to Embodiment 1, in particular, a protection operation of the Pch MOSFET performed at the time of an anomaly.

FIG. 6 is a diagram illustrating an operation of power supply protection circuit 10a according to Embodiment 1, and in particular, a protection operation performed at the time of an anomaly in the case where protection switch 2 is a Pch MOSFET. Although not shown in the diagram, a circuit that detects an anomaly in load circuit 3 will be described later.

As shown in FIG. 6, if an anomalous state of load circuit 3 such as, for example, a state in which load terminal TVIN and GND have been short-circuited, or a state in which the impedance has been lowered is detected, controller 5a fixes second switch 42a to on, and fixes first switch 41a to off. As a result, the gate and the source of protection switch 2 are short-circuited, and thus protection switch 2 is turned off. As a result of protection switch 2 being turned off, the supply of power from direct current power supply 1 to load circuit 3 is shut down. That is, at the time of an anomaly, controller 5a turns on second switch 42a, and turns off first switch 41a, third switch 43a, fourth switch 44a, and fifth switch 45a so as to shut down protection switch 2. As a result, further damage to load circuit 3 can be prevented, and direct current power supply 1 can be protected. Also, in order to save power, current supply 47 may stop operating.

Also, power supply protection circuit 10a according to Embodiment 1 may be configured as an integrated circuit such that at least voltage supply 46, current supply 47, and first switch 41a, second switch 42a, third switch 43a, fourth switch 44a, and fifth switch 45a are integrated into an integrated circuit, and first capacitor 40a is connected to the integrated circuit. In the case where protection switch 2 is a first semiconductor switch, first terminal BX of the integrated circuit, first terminal BX being a connection point between third switch 43a and fourth switch 44a, is connected to direct current power supply 1 or the ground potential, without being connected to first capacitor 40a. If it is detected that the potential of first terminal BX at the time of activation of power supply protection circuit 10a is the power supply voltage of direct current power supply 1 or the ground potential, controller 5a determines that protection switch 2 is a first semiconductor switch.

Next, a decision circuit that determines whether protection switch 2 is a Nch MOSFET that is an example of a second semiconductor switch or a Pch MOSFET that is an example of a first semiconductor switch, and also determines that whether or not load circuit 3 is properly operating, and the operations of a driving logic that drives each switch according to the output of the decision circuit will be described with reference to FIGS. 7A to 7D.

Figure 7A:
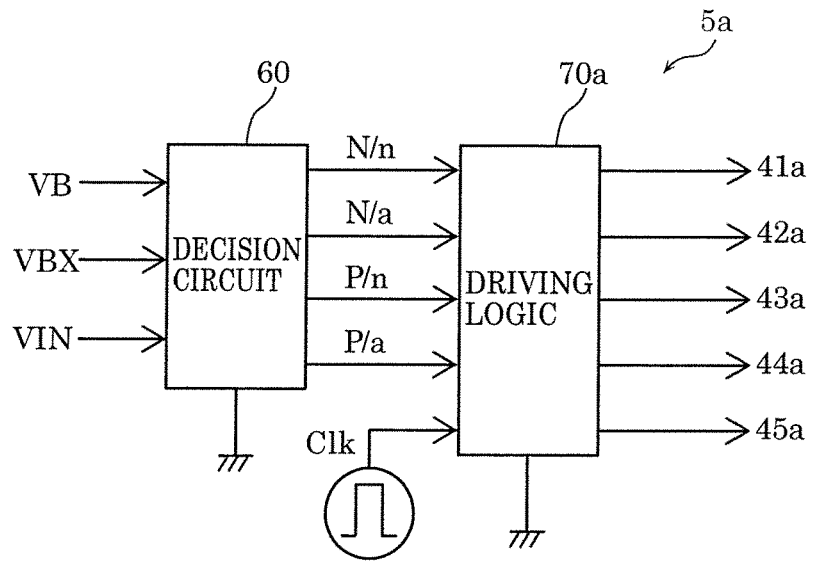
FIG. 7A is a block diagram showing a configuration of a controller according to Embodiment 1.

FIG. 7A is a block diagram showing a configuration of controller 5a according to Embodiment 1. Decision circuit 60 receives an input of power supply voltage VB, first voltage VBX of first terminal BX, and output voltage VIN of protection switch 2. Decision circuit 60 outputs signal N/n that indicates that protection switch 2 is a Nch MOSFET and load circuit 3 is in a proper operation state, signal N/a that indicates that protection switch 2 is a Nch MOSFET and load circuit 3 is in an anomalous state, signal P/n that indicates that protection switch 2 is a Pch MOSFET and load circuit 3 is in a proper operation state, and signal P/a that indicates that protection switch 2 is a Pch MOSFET and load circuit 3 is in an anomalous state, according to input signals. Driving logic 70a receives an input of signals N/n, N/a, P/n, and P/a, and clock pulse signal Clk, and outputs a driving signal to each switch.

Figure 7B:
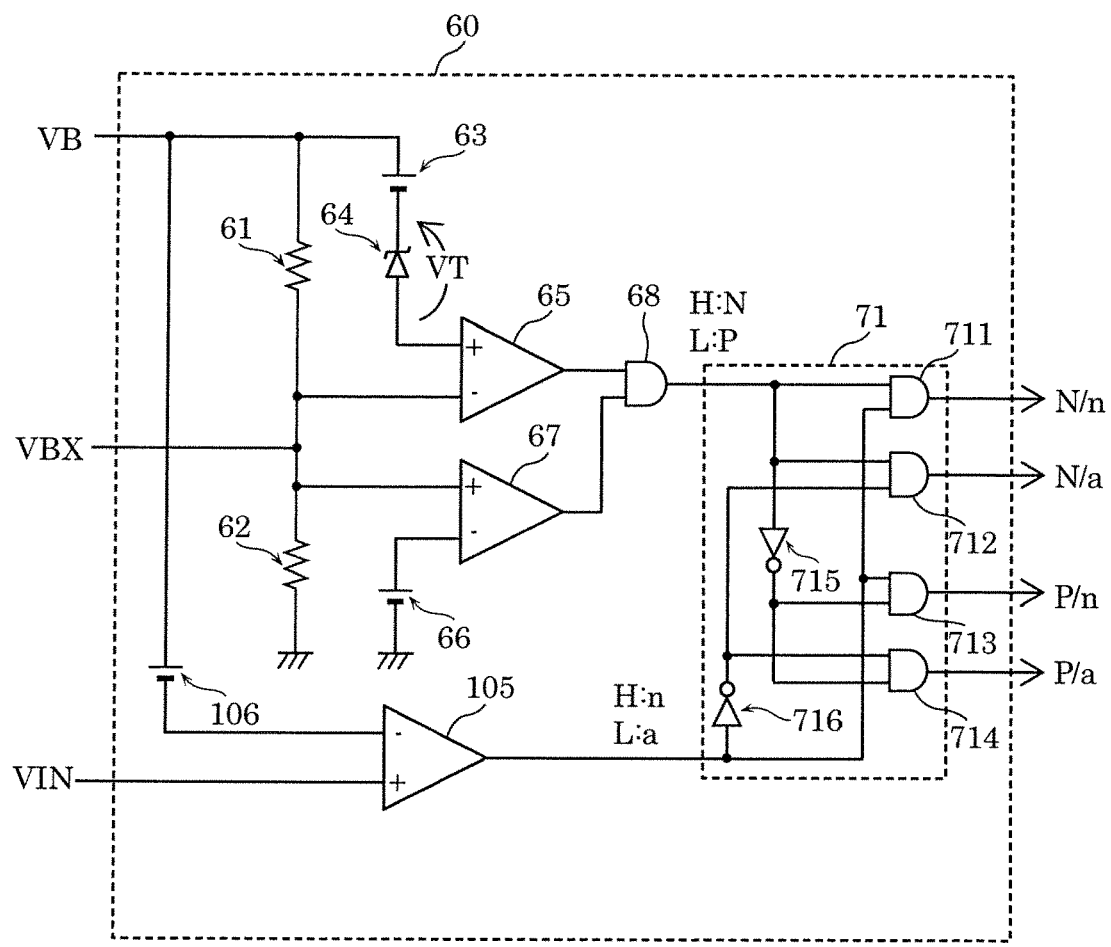
FIG. 7B is a circuit diagram showing a detailed configuration of a decision circuit according to Embodiment 1.

FIG. 7B is a circuit diagram that shows a detailed configuration of decision circuit 60 according to Embodiment 1. Power supply voltage VB is divided by resistor 61 and resistor 62 so as to generate an intermediate potential. First terminal BX is connected to the point of the intermediate potential. As a result, in the case where protection switch 2 is a Nch MOSFET, first terminal BX has the intermediate potential of power supply voltage VB before activation of power supply protection circuit 10a in which all of the switches are off. On the other hand, in the case where protection switch 2 is a Pch MOSFET, first terminal BX is connected to power supply voltage VB (or GND potential). First comparator 65 outputs a H level signal if the potential of first terminal BX is lower than power supply voltage VB by an amount corresponding to a first predetermined voltage, and second comparator 67 outputs a H level signal if the potential of first terminal BX is higher than GND potential by an amount corresponding to a second predetermined voltage. Here, the first predetermined voltage is generated by a series circuit that includes voltage supply 63 and Zener diode 64, and the second predetermined voltage is generated by voltage supply 66. Accordingly, if the output of first AND circuit 68, which is a logical product of the outputs of first comparator 65 and second comparator 67, is a H level signal, decision circuit 60 determines that the potential of first terminal BX is the intermediate potential of power supply voltage VB, and protection switch 2 is a Nch MOSFET. Conversely, if the output of first AND circuit 68 is a L level (Low level) signal, decision circuit 60 determines that the potential of first terminal BX is power supply voltage VB or GND potential, and protection switch 2 is a Pch MOSFET.

In power supply protection circuit 10a according to Embodiment 1, in the case where protection switch 2 is a Pch MOSFET, power supply voltage VB is applied to first terminal BX, and thus Zener diode 64 of decision circuit 60 is unnecessary. Zener diode 64 is provided so that decision circuit 60 can also be used in Embodiment 3, which will be described later. Embodiment 3 is different from other embodiments in that, in the case where protection switch 2 is a Pch MOSFET, voltage (VB-VT) is applied to first terminal BX.

Next, monitor comparator 105 compares output voltage VIN of protection switch 2 with a predetermined potential that is set separately. The predetermined potential is a potential that is lower than power supply voltage VB by an amount corresponding to the voltage of threshold voltage generator 106. If output voltage VIN is higher than the predetermined potential, monitor comparator 105 outputs a H level signal, and determines that load circuit 3 is in a proper operation state. If output voltage VIN is lower than the predetermined potential, monitor comparator 105 outputs a L level signal, and determines that load circuit 3 is in an anomalous state. The determination result is distributed by logic circuit 71, and signals N/n, N/a, P/n, and P/a are output. As shown in FIG. 7B, logic circuit 71 includes four AND circuits 711 to 714 and two inverters 715 and 716.

Figures 7C, 7D:
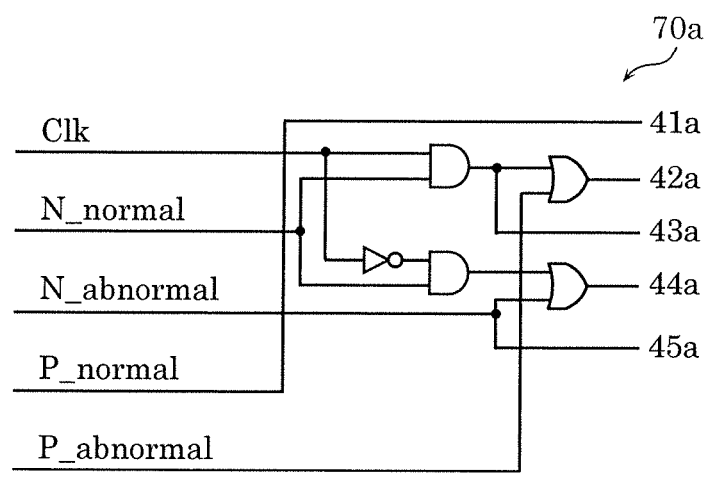
FIG. 7C is a circuit diagram showing a configuration of a driving logic of the controller according to Embodiment 1.
FIG. 7D is a table showing the states of the operations of first to fifth switches according to Embodiment 1.

FIG. 7C is a circuit diagram that shows a configuration of driving logic 70a of controller 5a according to Embodiment 1. FIG. 7D is a table that shows the states of the operations of first switch 41a, second switch 42a, third switch 43a, fourth switch 44a, and fifth switch 45a according to Embodiment 1. Although a detailed description is omitted here, the states of the switches as shown in FIG. 7D are obtained by a logic circuit as shown in FIG. 7C.

As described above, with power supply protection circuit 10a according to Embodiment 1, a potential that is lower than the input power supply voltage by an amount corresponding to driving voltage VT is generated by the first power supply circuit. If decision circuit 60 determines that protection switch 2 is a Pch MOSFET, and load circuit 3 is in a proper operation state, protection switch 2 is turned on by the first driving circuit applying a potential that is lower than power supply voltage VB by an amount corresponding to driving voltage VT (second driving voltage) to the gate of protection switch 2 that is a Pch MOSFET. Next, if decision circuit 60 determines that protection switch 2 is a Pch MOSFET, and load circuit 3 is in an anomalous state, protection switch 2 is turned off by short-circuiting the gate and the source of protection switch 2 that is a Pch MOSFET. If decision circuit 60 determines that protection switch 2 is a Nch MOSFET, and load circuit 3 is in a proper operation state, protection switch 2 is turned on by the second driving circuit applying a potential that is higher than power supply voltage VB by an amount corresponding to driving voltage VT (first driving voltage) to the gate of protection switch 2 that is a Nch MOSFET. Next, if decision circuit 60 determines that protection switch 2 is a Nch MOSFET, and load circuit 3 is in an anomalous state, protection switch 2 is turned off by short-circuiting the gate and the source of protection switch 2 that is a Nch MOSFET. As described above, with power supply protection circuit 10a according to the present embodiment, control is possible irrespective of whether protection switch 2 is a Pch MOSFET or a Nch MOSFET. Accordingly, protection switch 2 can be selected from a wide variety of devices, and ease of design can be achieved.

Also, power supply protection circuit 10a according to Embodiment 1 may be configured as an integrated circuit. With this configuration, ease of design and cost reduction can be achieved.

Also, because whether protection switch 2 is a Pch MOSFET or a Nch MOSFET is automatically determined at the time of activation by detecting the connection state of the control terminal of protection switch 2, it is unnecessary to provide a terminal dedicated for making a decision, and thus integration is facilitated.

Also, the state of load circuit 3 can be monitored to detect an anomaly at the time of activation, and thus a power supply system with a high level of safety can be achieved.

In the foregoing, an example has been described in which decision circuit 60 detects an anomalous state of load circuit 3 by monitoring output voltage VIN, but the method for determining an anomaly in power supply protection circuit 10a is not limited thereto. For example, decision circuit 60 may detect an anomalous state of load circuit 3 by detecting a supply current that flows through protection switch 2 and is supplied to load circuit 3, and, if the supply current is greater than or equal to a predetermined value, determining that load circuit 3 is in an anomalous state. Also, detection by monitoring output voltage VIN and detection using the supply current may be performed in combination. The detection using the supply current can be performed by using a method in which a resistor is provided in series to protection switch 2, and a drop in the voltage of the resistor is detected, a method in which an on voltage of protection switch 2 is detected, or the like, but the present disclosure does not limit the detection method.

Embodiment 2

A power supply protection circuit according to Embodiment 2 will be described. The power supply protection circuit according to Embodiment 2 is different from power supply protection circuit 10a according to Embodiment 1 mainly in terms of the configurations of the first driving circuit and the second driving circuit. Hereinafter, the power supply protection circuit according to Embodiment 2 will be described with reference to the drawings, focusing on the differences from power supply protection circuit 10a according to Embodiment 1.

Figure 8:
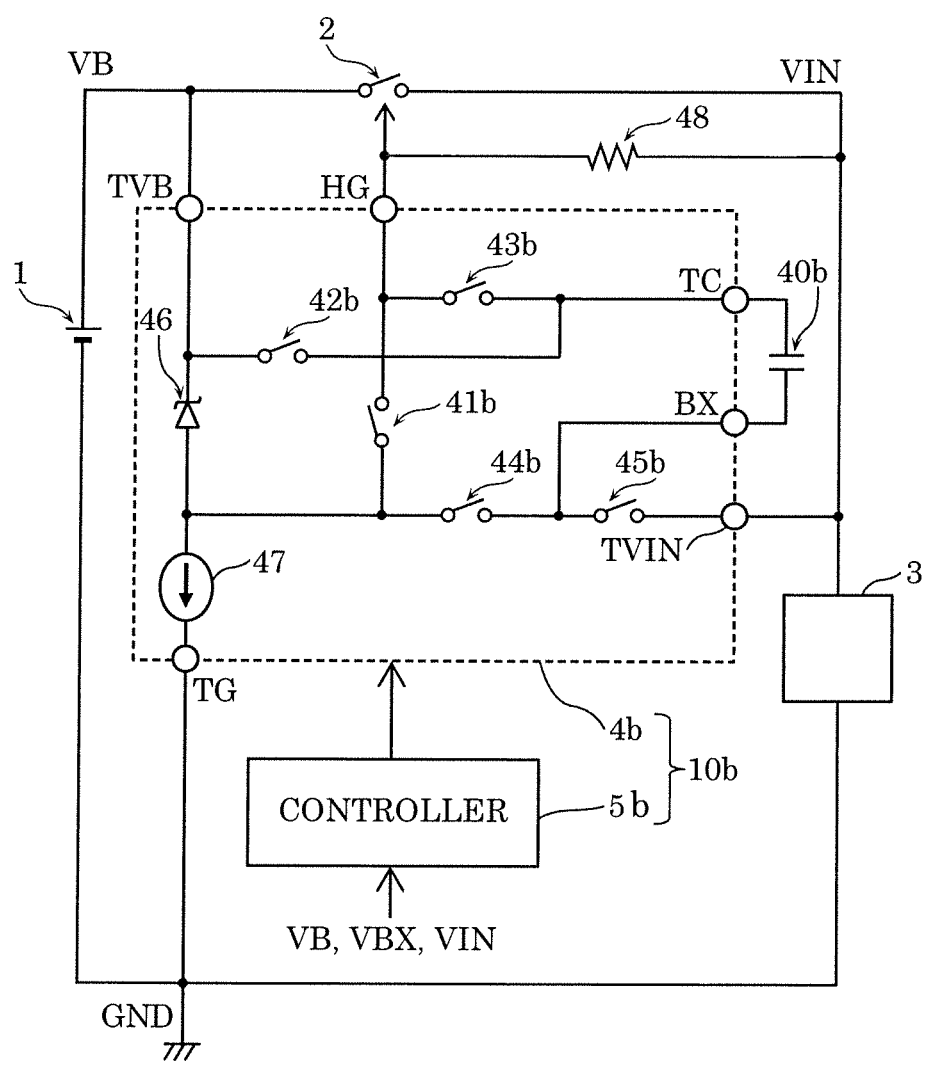
FIG. 8 is an overall circuit diagram of a power supply protection circuit according to Embodiment 2.

FIG. 8 is an overall circuit diagram of power supply protection circuit 10b according to Embodiment 2.

As shown in FIG. 8, power supply protection circuit 10b according to Embodiment 2 includes circuitry 4b and controller 5b.

Circuitry 4b includes: power supply terminal TVB that is connected to direct current power supply 1; driving terminal HG that is connected to the control terminal of protection switch 2; first terminal BX; connection terminal TC; load terminal TVIN that is connected to the output terminal of protection switch 2 and load circuit 3; and ground terminal TG that is connected to the ground potential.

In the present embodiment, circuitry 4b includes voltage supply 46, current supply 47, first switch 41b, second switch 42b, third switch 43b, fourth switch 44b, and fifth switch 45b. Also, circuitry 4b includes first capacitor 40b in the second state. Also, discharge resistor 48 is connected between driving terminal HG and load terminal TVIN of circuitry 4b.

Circuitry 4b includes a first power supply circuit, a first driving circuit, and a second driving circuit.

The first power supply circuit includes a series circuit that includes voltage supply 46 and current supply 47, the series circuit being connected to direct current power supply 1.

The first driving circuit includes: a series circuit that includes first switch 41b that is connected between the control terminal of protection switch 2 and a connection point between voltage supply 46 and current supply 47; and second switch 42b and third switch 43b that are connected between direct current power supply 1 and the control terminal of protection switch 2.

The second driving circuit includes second switch 42b that is also used in the first driving circuit, and also includes: a series circuit that includes fourth switch 44b and fifth switch 45b, the series circuit being connected between the output terminal of protection switch 2 and the connection point between voltage supply 46 and current supply 47; first capacitor 40b that is connected between a connection point between second switch 42b and third switch 43b and a connection point between fourth switch 44b and fifth switch 45b; and discharge resistor 48 that is provided between the control terminal and the output terminal of protection switch 2.

When circuitry 4b is in the first state, controller 5b turns on second switch 42b, and turns off at least one of fourth switch 44b and fifth switch 45b.

In a normal operation, controller 5b turns on first switch 41b, and turns off third switch 43b so as to render protection switch 2 conductive. At the time of an anomaly, controller 5b turns on third switch 43b, and turns off first switch 41b so as to shut down protection switch 2.

When circuitry 4b is in the second state, controller 5b turns off first switch 41b. In a normal operation, controller 5b simultaneously turns on or off second switch 42b and fourth switch 44b at a predetermined cycle, and turns on or off third switch 43b and fifth switch 45b alternately with second switch 42b, so as to render protection switch 2 conductive. At the time of an anomaly, controller 5b turns on second switch 42b and fourth switch 44b, and turns off third switch 43b and fifth switch 45b, so as to shut down protection switch 2.

Also, the power supply protection circuit according to Embodiment 2 may be configured as an integrated circuit such that at least voltage supply 46, current supply 47, and first switch 41b, second switch 42b, third switch 43b, fourth switch 44b, and fifth switch 45b described above are integrated into an integrated circuit, and first capacitor 40b is connected to the integrated circuit. In the case where protection switch 2 is a first semiconductor switch, first terminal BX of the integrated circuit, first terminal BX being a connection point between fourth switch 44b and fifth switch 45b, is connected to direct current power supply 1, without being connected to first capacitor 40b. If it is detected at the time of activation of power supply protection circuit 10b that the potential of first terminal BX is the power supply voltage of direct current power supply 1, it is determined that protection switch 2 is a first semiconductor switch.

Also, in Embodiment 1 described above, protection switch 2 is turned off by the gate capacitance being discharged during normal operations. However, Embodiment 2 is configured such that the gate voltage is held, and thus protection switch 2 is kept turned on. Accordingly, a power loss caused by protection switch 2 being turned on and off can be reduced.

Next, the operations of power supply protection circuit 10b performed when circuitry 4b is in the second state will be described with reference to FIGS. 9 to 11. Here, an example will be described in which protection switch 2 is a Nch MOSFET.

Figure 9:
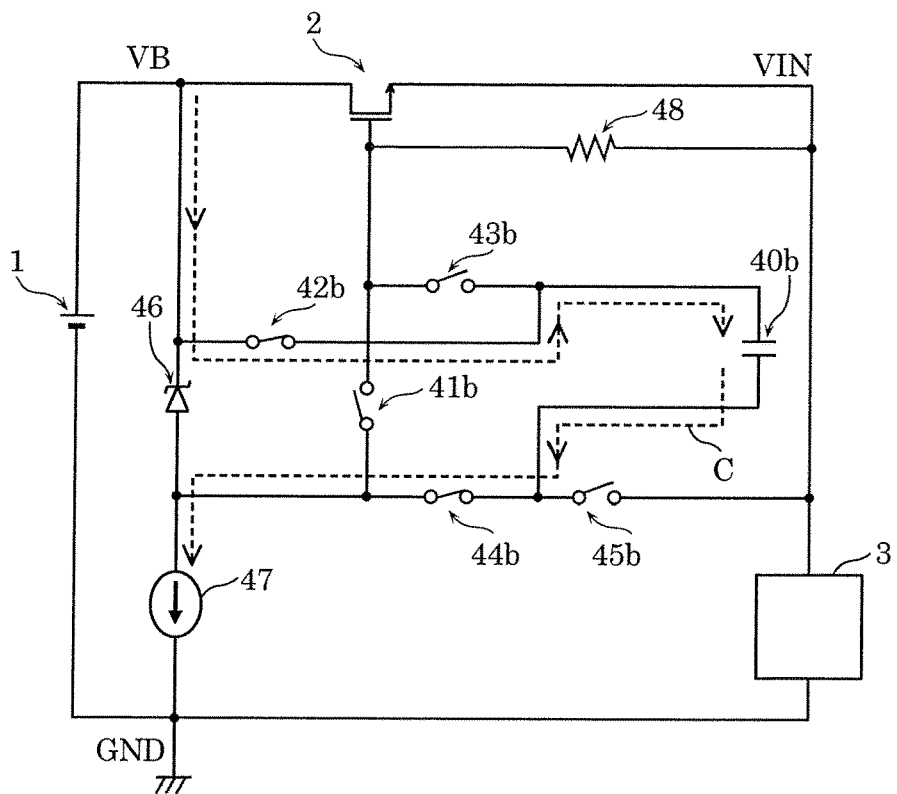
FIG. 9 is a diagram illustrating an operation of the power supply protection circuit according to Embodiment 2, in particular, a first normal operation of a Nch MOSFET.

FIG. 9 is a diagram illustrating an operation of the power supply protection circuit according to Embodiment 2, in particular, a first normal operation of a Nch MOSFET.

As shown in FIG. 9, in the normal operation, first switch 41b is fixed to off, second switch 42b and fourth switch 44b are repeatedly turned on and off in synchronization with each other, and third switch 43b and fifth switch 45b are repeatedly turned on and off in an opposite phase. Also, in the first normal operation, second switch 42b and fourth switch 44b are turned on, and third switch 43b and fifth switch 45b are turned off. Also, an electric current flows as indicated by dotted arrow C shown in FIG. 9, and driving voltage VT is applied to first capacitor 40b. At this time, the gate of protection switch 2 that is a Nch MOSFET is discharged with time constant CR that is determined based on resistor value R of discharge resistor 48 and gate capacitance C of protection switch 2. By setting resistor value R of discharge resistor 48 such that time constant CR is sufficiently larger than the cycle of the switch control signal, the gate voltage of protection switch 2 is held.

Figure 10:
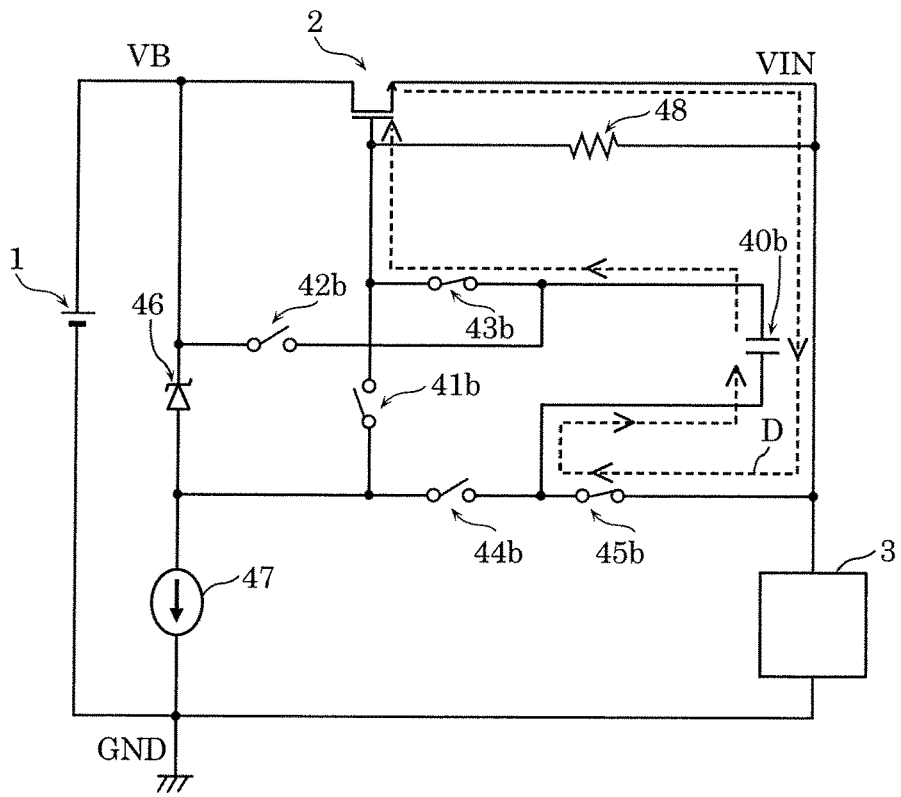
FIG. 10 is a diagram illustrating an operation of the power supply protection circuit according to Embodiment 2, in particular, a second normal operation of the Nch MOSFET.

FIG. 10 is a diagram illustrating an operation of power supply protection circuit 10b according to Embodiment 2, in particular, a second normal operation of the Nch MOSFET.

As shown in FIG. 10, second switch 42b and fourth switch 44b are turned off, and third switch 43b and fifth switch 45b are turned on. At this time, an electric current flows as indicated by dotted arrow D shown in FIG. 10, and the voltage of first capacitor 40b is applied to the gate of protection switch 2. Also, the gate and the source of protection switch 2 are maintained at driving voltage VT (first driving voltage), and protection switch 2 is turned on.

Figure 11:
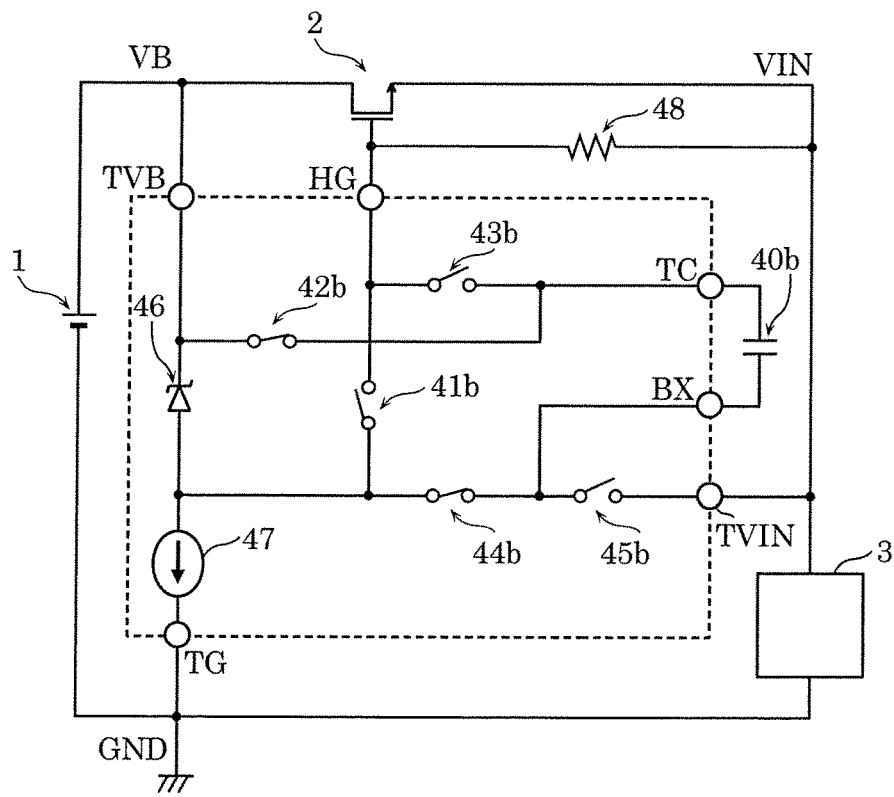
FIG. 11 is a diagram illustrating an operation of the power supply protection circuit according to Embodiment 2, in particular, a protection operation of the Nch MOSFET performed at the time of an anomaly.

FIG. 11 is a diagram illustrating an operation of power supply protection circuit 10b according to Embodiment 2, in particular, a protection operation of the Nch MOSFET performed at the time of an anomaly.

As shown in FIG. 11, in the protection operation at the time of an anomaly, the state of the first normal operation is held. Also, the electric charges of the gate capacitance of protection switch 2 are discharged via discharge resistor 48, and protection switch 2 is eventually turned off. In order to save power, current supply 47 may stop operating.

Next, an operation of power supply protection circuit 10b performed when circuitry 4b is in the first state will be described with reference to FIGS. 12 and 13. Here, an example will be described in which protection switch 2 of power supply protection circuit 10b according to Embodiment 2 is a Pch MOSFET. In this case, it is unnecessary to provide first capacitor 40b shown in FIGS. 9 to 11. Also, in the first state, controller 5b turns on second switch 42b, and turns off fourth switch 44b.

Figure 12:
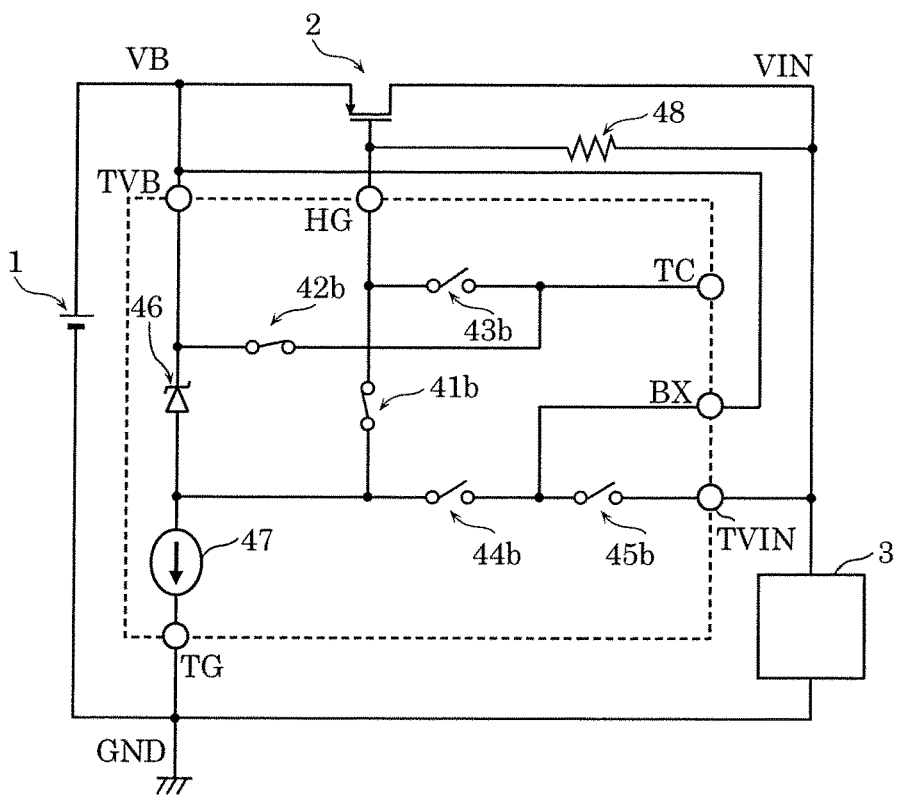
FIG. 12 is a diagram illustrating an operation of the power supply protection circuit according to Embodiment 2, in particular, a normal operation of a Pch MOSFET.

FIG. 12 is a diagram illustrating an operation of the power supply protection circuit according to Embodiment 2, in particular, a normal operation of a Pch MOSFET.

As shown in FIG. 12, in the normal operation, controller 5b turns on first switch 41b, and turns off third switch 43b. Fifth switch 45b may be either on or off. Also, a voltage that is lower than the source voltage by an amount corresponding to driving voltage VT (second driving voltage) is applied to the gate of protection switch 2 that is a Pch MOSFET, and thus protection switch 2 is constantly turned on.

Figure 13:
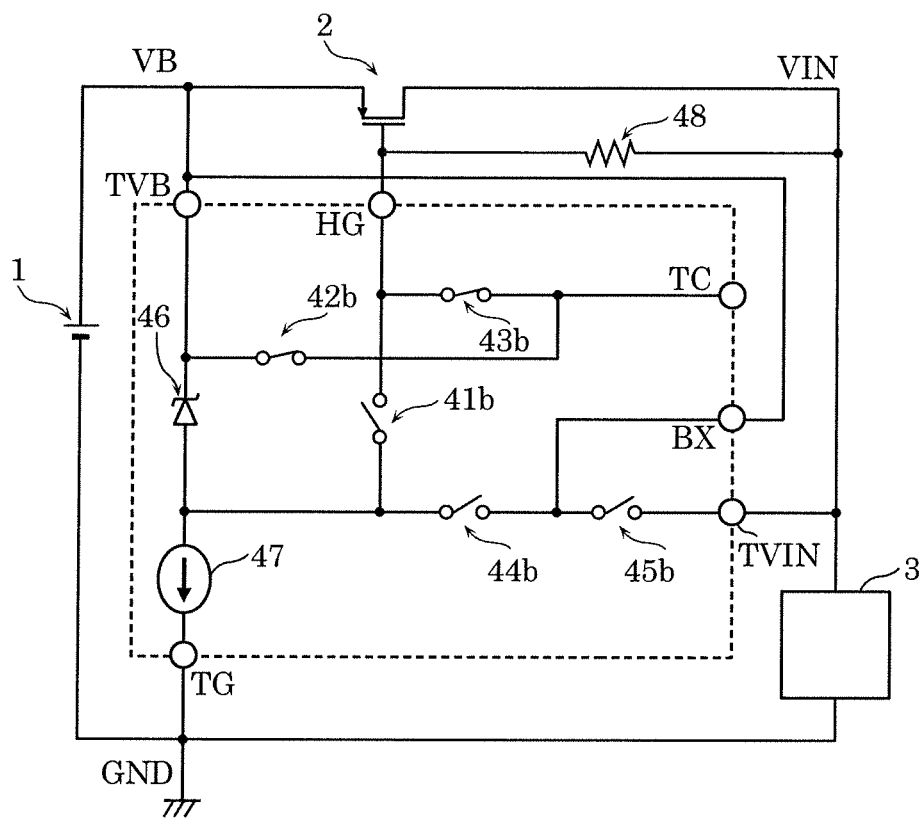
FIG. 13 is a diagram illustrating an operation of the power supply protection circuit according to Embodiment 2, in particular, a protection operation of the Pch MOSFET performed at the time of an anomaly.

FIG. 13 is a diagram illustrating an operation of power supply protection circuit 10b according to Embodiment 2, in particular, a protection operation of the Pch MOSFET performed at the time of an anomaly.

As shown in FIG. 13, if an anomalous state of load circuit 3 is detected, controller 5b fixes second switch 42b and third switch 43b to on, and fixes first switch 41b to off so as to cause a short circuit between the gate and the source of protection switch 2 and turn off protection switch 2. In order to save power, current supply 47 may stop operating.

Figures 14A, 14B:
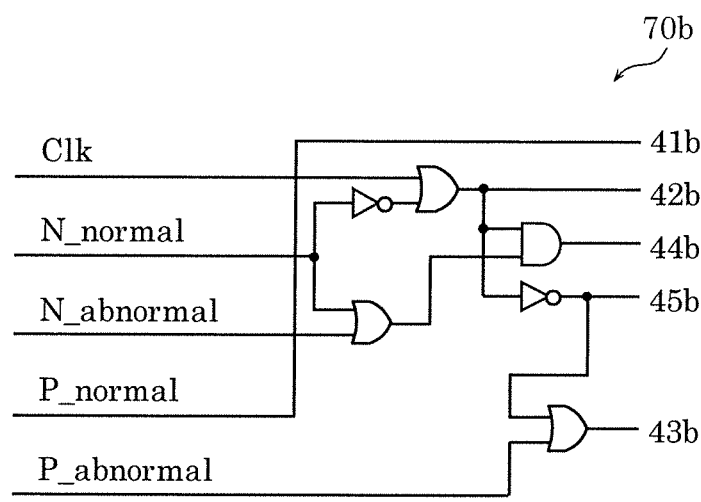
FIG. 14A is a circuit diagram showing a configuration of a driving logic of a controller according to Embodiment 2.
FIG. 14B is a table showing the states of the operations of first to fifth switches according to Embodiment 2.

Next, a configuration of controller 5b will be described with reference to FIGS. 14A and 14B. FIG. 14A is a circuit diagram showing a configuration of driving logic 70b of controller 5b according to Embodiment 2. FIG. 14B is a table showing the states of the operations of first switch 41b, second switch 42b, third switch 43b, fourth switch 44b, and fifth switch 45b according to Embodiment 2. Controller 5b according to the present embodiment includes driving logic 70b as shown in FIG. 14A in place of driving logic 70a of controller 5a of Embodiment 1. Although a detailed description is omitted here, the states of the switches as shown in FIG. 14B are obtained by a logic circuit as shown in FIG. 14A.

As described above, even with power supply protection circuit 10b according to Embodiment 2, the same advantageous effects as those of power supply protection circuit 10a according to Embodiment 1 can be obtained.

Embodiment 3

A power supply protection circuit according to Embodiment 3 will be described. The power supply protection circuit according to Embodiment 3 is different from the power supply protection circuits according to Embodiments 1 and 2 mainly in terms of the configurations of the first driving circuit and the second driving circuit. Hereinafter, the power supply protection circuit according to Embodiment 3 will be described with reference to the drawings, focusing on the differences from the power supply protection circuits according to Embodiments 1 and 2 described above.

Figure 15:
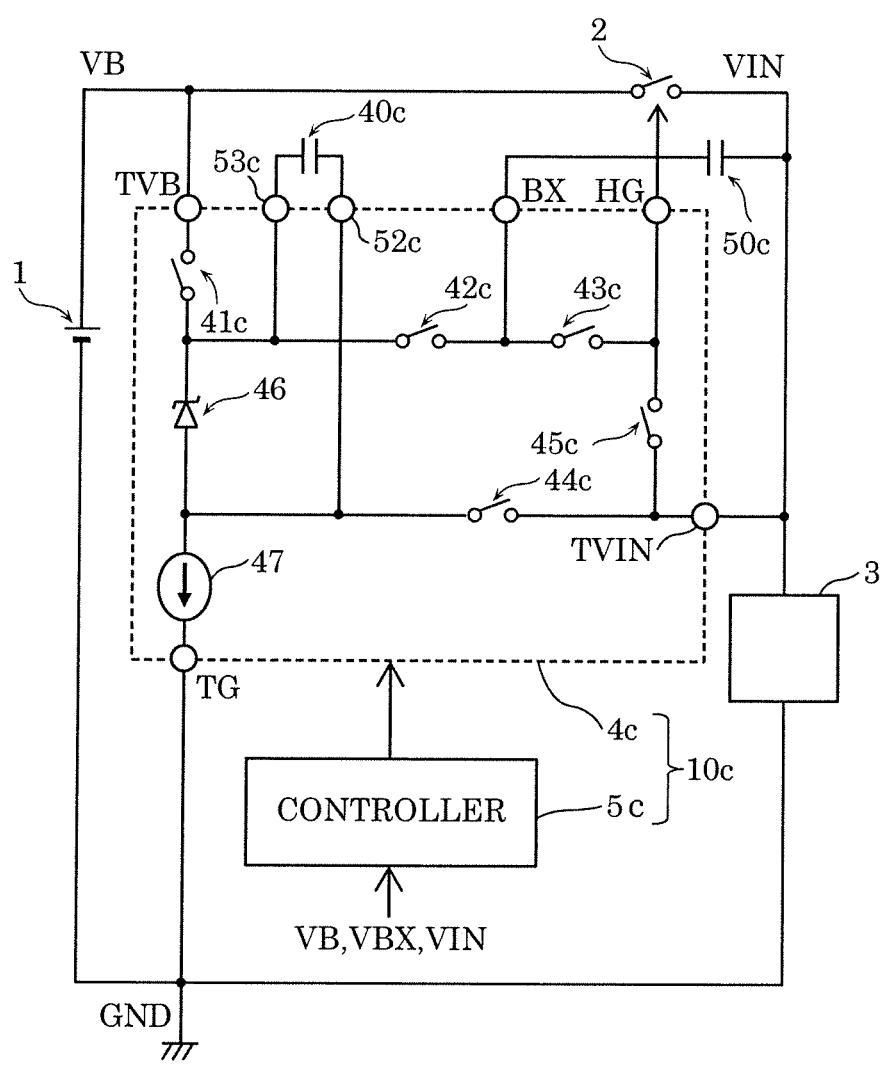
FIG. 15 is an overall circuit diagram of a power supply protection circuit according to Embodiment 3.

FIG. 15 is an overall circuit diagram of power supply protection circuit 10c according to Embodiment 3.

As shown in FIG. 15, power supply protection circuit 10c according to Embodiment 3 includes circuitry 4c and controller 5c.

Circuitry 4c includes: power supply terminal TVB that is connected to direct current power supply 1; driving terminal HG that is connected to the control terminal of protection switch 2; first terminal BX, second terminal 52c; third terminal 53c; load terminal TVIN that is connected to the output terminal of protection switch 2 and load circuit 3; and ground terminal TG that is connected to the ground potential. First terminal BX is a connection point between second switch 42c and third switch 43c. Second terminal 52c is a connection point between voltage supply 46 and current supply 47. Third terminal 53c is a connection point between first switch 41c and voltage supply 46.

In the present embodiment, circuitry 4c includes voltage supply 46, current supply 47, first switch 41c, second switch 42c, third switch 43c, fourth switch 44c, and fifth switch 45c. Also, circuitry 4c includes first capacitor 50c and second capacitor 40c in the second state.

Circuitry 4c includes a first power supply circuit, a first driving circuit, and a second driving circuit.

The first power supply circuit includes a series circuit that includes first switch 41c, voltage supply 46, and current supply 47, the series circuit being connected to direct current power supply 1.

The first driving circuit includes a series circuit that includes second switch 42c and third switch 43c, the series circuit being connected between the control terminal of protection switch 2 and a connection point between first switch 41c and voltage supply 46.

The second driving circuit includes second switch 42c that is also used in the first driving circuit, and also includes: first capacitor 50c that is connected between first terminal BX and the output terminal of protection switch 2; fourth switch 44c that is connected between the output terminal of protection switch 2 and the connection point between voltage supply 46 and current supply 47; and fifth switch 45c that is connected between the control terminal and the output terminal of protection switch 2.

In the case where protection switch 2 is a first semiconductor switch, or in other words, when circuitry 4d is in the first state, first terminal BX is connected to second terminal 52c without being connected to first capacitor 50c. Controller 5c turns on first switch 41c and third switch 43c, and turns off fourth switch 44c and fifth switch 45c. In a normal operation, controller 5c turns off second switch 42c so as to render protection switch 2 conductive. At the time of an anomaly, controller 5c turns on second switch 42c so as to shut down protection switch 2.

In the case where protection switch 2 is a second semiconductor switch, or in other words, when circuitry 4c is in the second state, first terminal BX is not connected to second terminal 52c. In a normal operation, controller 5c turns on or off first switch 41c at a predetermined cycle, turns on or off second switch 42c and fourth switch 44c alternately with first switch 41c, turns on third switch 43c, and turns off fifth switch 45c, so as to render protection switch 2 conductive. At the time of an anomaly, controller 5c turns on fifth switch 45c, and turns off first switch 41c, second switch 42c, third switch 43c, and fourth switch 44c, so as to shut down protection switch 2.

Also, power supply protection circuit 10c according to Embodiment 3 may be configured as an integrated circuit such that at least voltage supply 46, current supply 47, and first switch 41c, second switch 42c, third switch 43c, fourth switch 44c, and fifth switch 45c are integrated into an integrated circuit, and first capacitor 50c and second capacitor 40c are connected to the integrated circuit. In the case where protection switch 2 is a first semiconductor switch, first terminal BX is connected to second terminal 52c without being connected to first capacitor 50c. If it is detected at the time of activation of power supply protection circuit 10c that the potential of first terminal BX is greater than or equal to a predetermined value, it is determined that protection switch 2 is a first semiconductor switch.

Next, the operations of power supply protection circuit 10c performed when circuitry 4c is in the second state will be described with reference to FIGS. 16 to 18. Here, an example will be described in which protection switch 2 is a Nch MOSFET. In this case, controller 5c turns on and off second switch 42c and fourth switch 44c in synchronization with each other, and turns on and off first switch 41c in an opposite phase.

Figure 16:
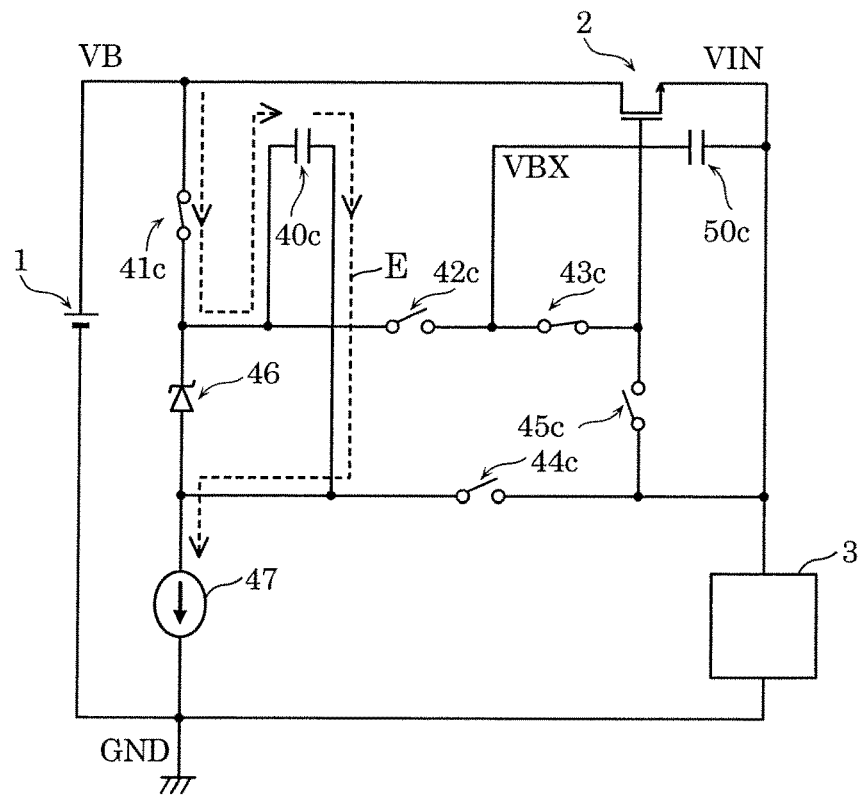
FIG. 16 is a diagram illustrating an operation of the power supply protection circuit according to Embodiment 3, in particular, a first normal operation of a Nch MOSFET.

FIG. 16 is a diagram illustrating an operation of power supply protection circuit 10c according to Embodiment 3, in particular, a first normal operation of a Nch MOSFET.

As shown in FIG. 16, in the first normal operation, controller 5c turns off second switch 42c, fourth switch 44c, and fifth switch 45c, and turns on first switch 41c and third switch 43c. As a result, an electric current flows as indicated by dotted arrow E shown in FIG. 16, and driving voltage VT (first driving voltage) is applied between the terminals of second capacitor 40c. At this time, the voltage of first capacitor 50c is applied between the gate and the source of protection switch 2 that is a Nch MOSFET, and protection switch 2 is turned on.

Figure 17:
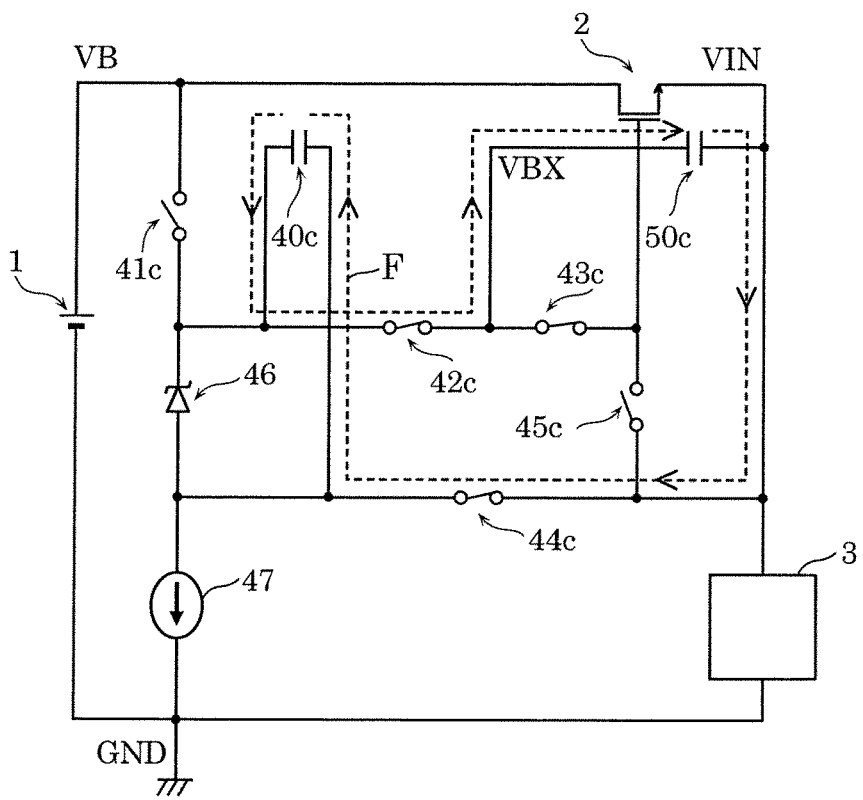
FIG. 17 is a diagram illustrating an operation of the power supply protection circuit according to Embodiment 3, in particular, a second normal operation of the Nch MOSFET.

FIG. 17 is a diagram illustrating an operation of power supply protection circuit 10c according to Embodiment 3, in particular, a second normal operation of the Nch MOSFET.

As shown in FIG. 17, in the second normal operation, controller 5c turns on second switch 42c and fourth switch 44c, and turns off first switch 41c. At this time, an electric current flows as indicated by dotted arrow F shown in FIG. 17, and power is supplied from second capacitor 40c to first capacitor 50c. Also, the gate voltage of protection switch 2 rises. In order to save power, current supply 47 may stop operating.

Figure 18:
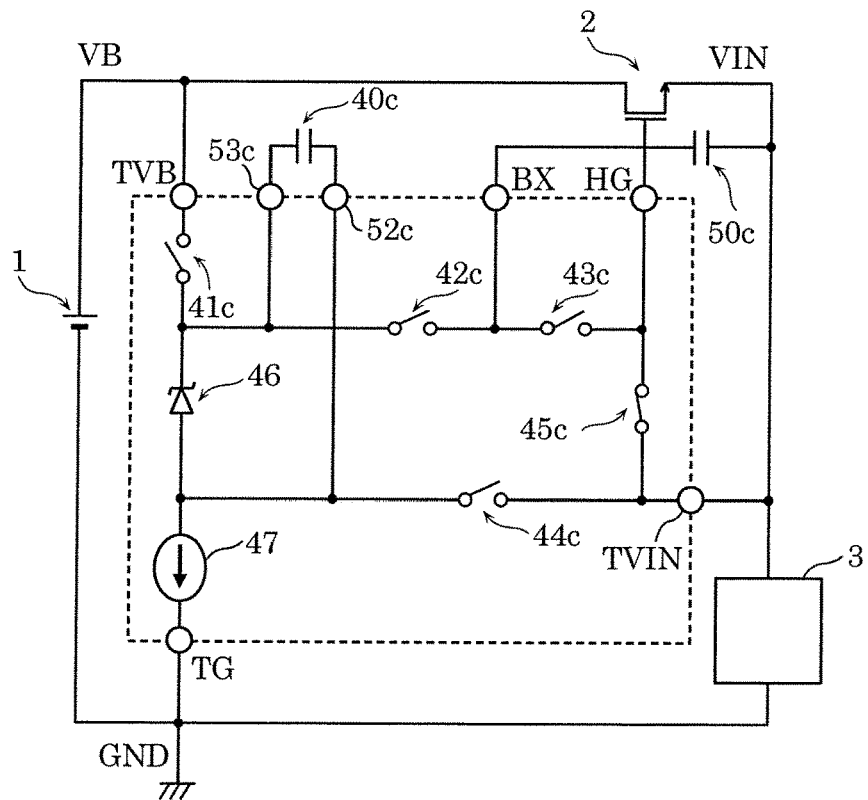
FIG. 18 is a diagram illustrating an operation of the power supply protection circuit according to Embodiment 3, in particular, a protection operation of the Nch MOSFET performed at the time of an anomaly.

FIG. 18 is a diagram illustrating an operation of power supply protection circuit 10c according to Embodiment 3, in particular, a protection operation of the Nch MOSFET performed at the time of an anomaly.

As shown in FIG. 18, in the protection operation at the time of an anomaly, controller 5c turns on fifth switch 45c so as to turn off protection switch 2, and fixes first switch 41c, second switch 42c, third switch 43c, and fourth switch 44c to off. In order to save power, current supply 47 may stop operating.

Next, power supply protection circuit 10c according to Embodiment 3 in the case where protection switch 2 is a first semiconductor switch will be described with reference to FIGS. 19 and 20. In this case, it is unnecessary to provide first capacitor 50c and second capacitor 40c. Also, controller 5c turns on first switch 41c and third switch 43c, and turns off fourth switch 44c and fifth switch 45c. Also, first terminal BX is connected to second terminal 52c.

Figure 19:
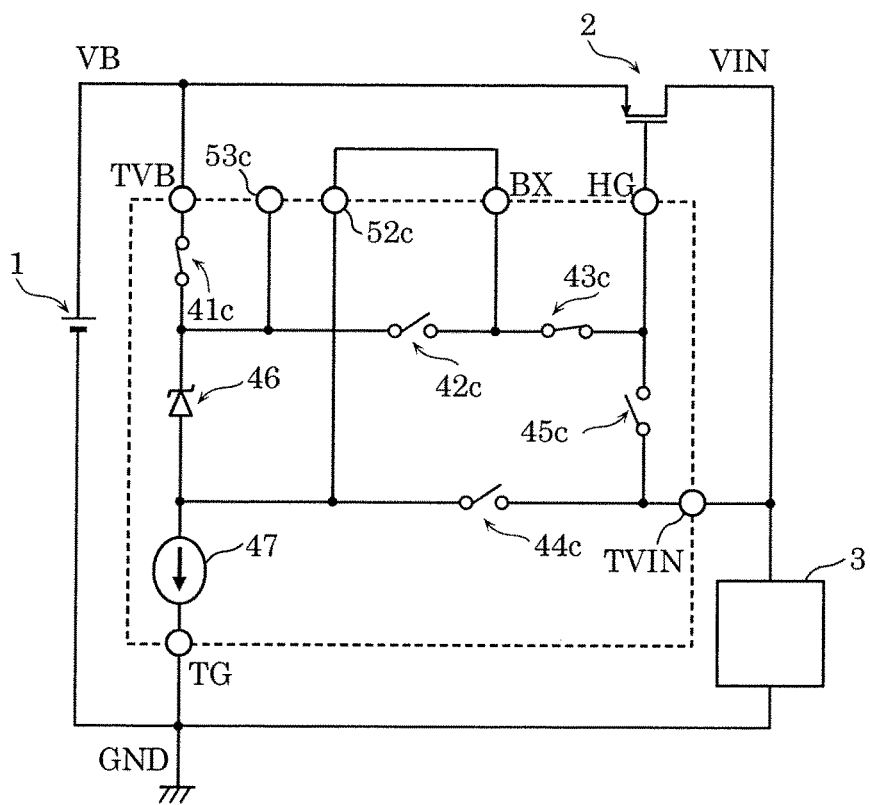
FIG. 19 is a diagram illustrating an operation of the power supply protection circuit according to Embodiment 3, in particular, a normal operation of a Pch MOSFET.

FIG. 19 is a diagram illustrating an operation of power supply protection circuit 10c according to Embodiment 3, in particular, a normal operation of a Pch MOSFET.

As shown in FIG. 19, in the normal operation, controller 5c turns off second switch 42c. Also, a voltage that is lower than the source voltage by an amount corresponding to driving voltage VT (second driving voltage) is applied to the gate of protection switch 2 that is a Pch MOSFET, and thus protection switch 2 is turned on.

Figure 20:
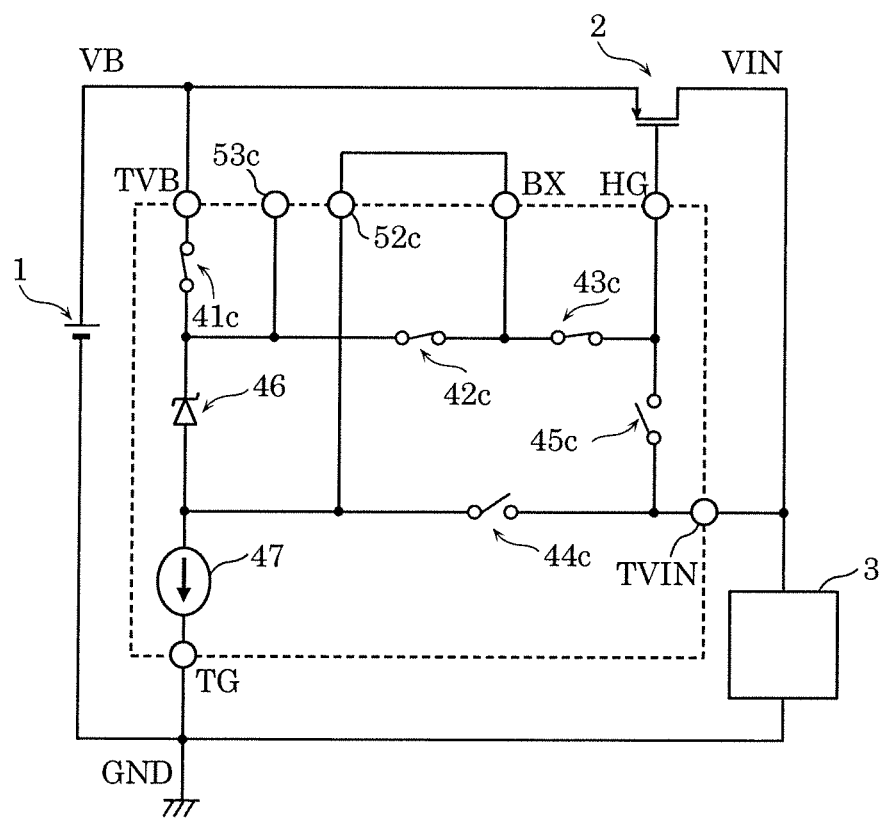
FIG. 20 is a diagram illustrating an operation of the power supply protection circuit according to Embodiment 3, in particular, a protection operation of the Pch MOSFET performed at the time of an anomaly.

FIG. 20 is a diagram illustrating an operation of power supply protection circuit 10c according to Embodiment 3, in particular, a protection operation of the Pch MOSFET performed at the time of an anomaly.

As shown in FIG. 20, in the protection operation at the time of an anomaly, controller 5c turns on second switch 42c. Also, the gate of protection switch 2 is shorted with the source, and thus protection switch 2 is turned off. In order to save power, current supply 47 may stop operating.

Figures 21A, 21B:
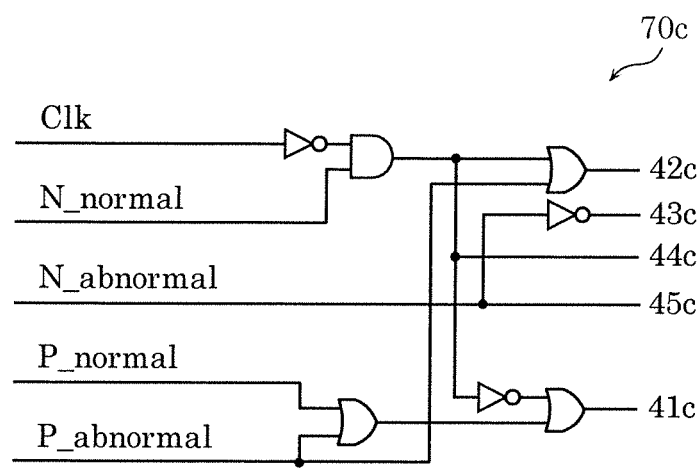
FIG. 21A is a circuit diagram showing a configuration of a driving logic of a controller according to Embodiment 3.
FIG. 21B is a table showing the states of the operations of first to fifth switches according to Embodiment 3.

Next, a configuration of controller 5c will be described with reference to FIGS. 21A and 21B. FIG. 21A is a circuit diagram that shows a configuration of driving logic 70c of controller 5c according to Embodiment 3. FIG. 21B is a table showing the states of the operations of first switch 41c, second switch 42c, third switch 43c, fourth switch 44c, and fifth switch 45c according to Embodiment 3. Controller 5c according to the present embodiment includes driving logic 70c as shown in FIG. 21A in place of driving logic 70a of controller 5a according to Embodiment 1. Although a detailed description is omitted here, the states of the switches as shown in FIG. 21B are obtained by a logic circuit as shown in FIG. 21A.

As described above, even with power supply protection circuit 10c according to Embodiment 3, the same advantageous effects as those of power supply protection circuit 10a according to Embodiment 1 can be obtained.

Embodiment 4

A power supply protection circuit according to Embodiment 4 will be described. In order to stabilize the supply voltage to load circuit 3, a stabilization power supply circuit may be provided on the input side of load circuit 3. In Embodiment 4, a power supply protection circuit suitable when a step-down converter is used as the stabilization power supply circuit will be described with reference to FIGS. 22 to 28B, focusing on the differences from the power supply protection circuit according to Embodiment 1.

Figure 22:
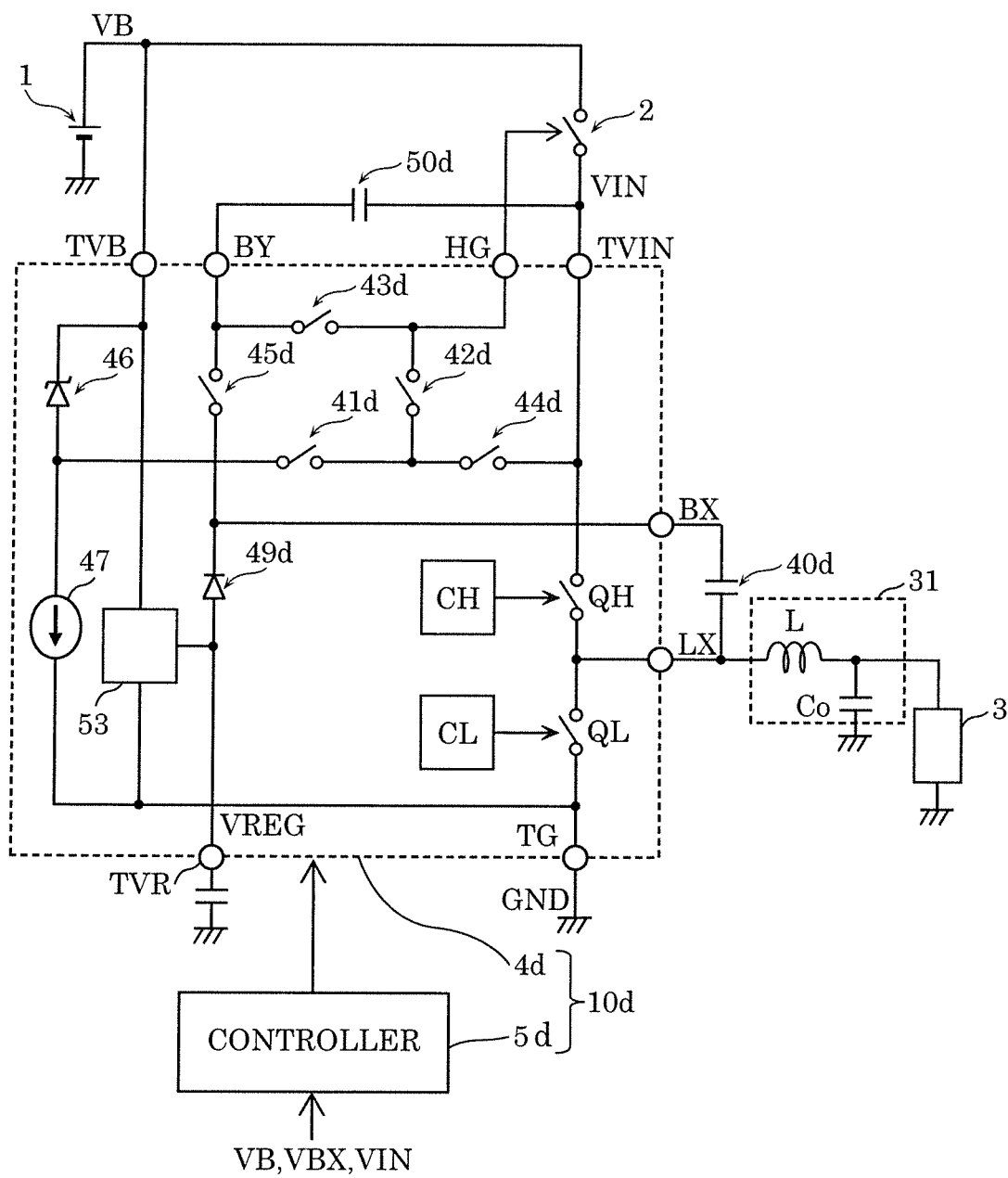
FIG. 22 is an overall circuit diagram of a power supply protection circuit according to Embodiment 4.

FIG. 22 is an overall configuration diagram of power supply protection circuit 10d according to Embodiment 4. As shown in FIG. 22, power supply protection circuit 10d includes circuitry 4d and controller 5d.

Circuitry 4d includes: power supply terminal TVB that is connected to direct current power supply 1; driving terminal HG that is connected to the control terminal of protection switch 2; first terminal BX; connection terminal BY; intermediate terminal LX; regulator terminal TVR; load terminal TVIN that is connected to the output terminal of protection switch 2; and ground terminal TG that is connected to the ground potential.

A step-down converter is provided between protection switch 2 and load circuit 3 that are connected to direct current power supply 1. The step-down converter provided on the input side of load circuit 3 includes a series circuit that includes high side switch QH and low side switch QL that are alternately turned on and off at a predetermined cycle by control driving circuits CH and CL. High side switch QH is connected to the output terminal of protection switch 2, and a predetermined voltage is supplied to load circuit 3 via filter circuit 31 from intermediate terminal LX that is a connection point between high side switch QH and low side switch QL, filter circuit 31 being a filter circuit that includes inductor L and smoothing capacitor Co.

As shown in FIG. 22, circuitry 4d of power supply protection circuit 10d according to the present embodiment includes a series circuit that includes control driving circuits CH and CL, high side switch QH, and low side switch QL of the step-down converter. High side switch QH is connected to the output terminal of protection switch 2. Circuitry 4d further includes: voltage supply 46 and current supply 47 that constitute a first power supply circuit that generates a first potential that is lower than the power supply voltage of direct current power supply 1 by an amount corresponding to first driving voltage VT; a first driving circuit that includes first switch 41d, second switch 42d, third switch 43d, and fourth switch 44d that apply the first potential to the control terminal of protection switch 2 in the case where protection switch 2 is a first semiconductor switch (or in other words, when circuitry 4d is in the first state); second power supply circuit 53 that includes a series regulator and the like, and generates a second potential that is higher than the ground potential by an amount corresponding to second driving voltage VREG by using the power supply voltage of direct current power supply i; and a second driving circuit that applies second driving voltage VREG between the control terminal and the output terminal of protection switch 2 in the case where protection switch 2 is a second semiconductor switch.

The second driving circuit includes: a first bootstrap circuit that includes a series circuit that includes first capacitor 40d and first rectifier element 49d that is a diode or the like, the series circuit being connected between second power supply circuit 53 and intermediate terminal LX that is the connection point between high side switch QH and low side switch QL, the first bootstrap circuit applying second driving voltage VREG to first capacitor 40d via first rectifier element 49d from second power supply circuit 53 when low side switch QL is turned on; and a second bootstrap circuit that includes a series circuit that includes second rectifier element 45d and second capacitor 50d, the series circuit being connected between first capacitor 40d and the output terminal of protection switch 2, the second bootstrap circuit applying second driving voltage VREG to second capacitor 50d via second rectifier element 45d from first capacitor 40d when high side switch QH is turned on. A connection point between second rectifier element 45d and second capacitor 50d is denoted by connection terminal BY.

The first power supply circuit includes a series circuit that includes voltage supply 46 that is connected to direct current power supply 1 and generates driving voltage VT for protection switch 2 and current supply 47. The first driving circuit includes: a series circuit that includes first switch 41d and second switch 42d, the series circuit being connected between the control terminal of protection switch 2 and a connection point between voltage supply 46 and current supply 47; third switch 43d whose one terminal is connected to the control terminal of protection switch 2, connection terminal BY to which another terminal of third switch 43d is connected, and fourth switch 44d that is connected between the output terminal of protection switch 2 and a connection point between first switch 41d and second switch 42d.

Next, the operations of power supply protection circuit 10b performed when circuitry 4d is in the second state will be described with reference to FIGS. 23 to 25. Here, an operation of power supply protection circuit 10d according to Embodiment 4 in the case where protection switch 2 is a Nch MOSFET will be described. In this case, fourth switch 44d is turned on. In order to save power, current supply 47 may stop operating.

Figure 23:
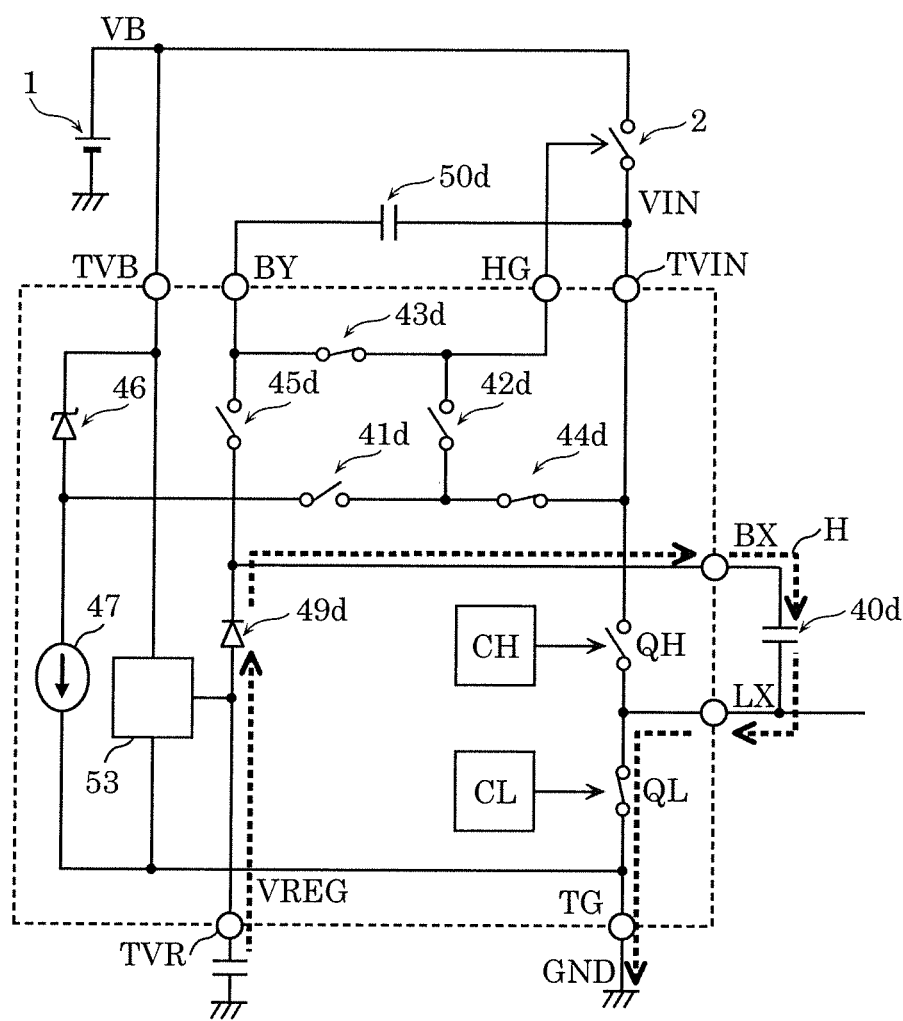
FIG. 23 is a diagram illustrating an operation of a power supply protection circuit according to Embodiment 4, in particular, a first normal operation of a Nch MOSFET.

FIG. 23 is a diagram illustrating an operation of power supply protection circuit 10d according to Embodiment 4, in particular, a first normal operation performed in the case where protection switch 2 is a Nch MOSFET.

The first normal operation shown in FIG. 23 refers to the state in which, in the step-down converter, high side switch QH that performs switching operation is turned off, and low side switch QL is turned on. An electric current flows from second power supply circuit 53 via first rectifier element 49d as indicated by dotted arrow H shown in FIG. 23, and voltage VREG is applied to first capacitor 40d. Third switch 43d is turned on, and the voltage of second capacitor 50d is applied between the gate and the source of protection switch 2. As will be described next in a second normal operation, electric charges are supplied to second capacitor 50d, and protection switch 2 is turned on by the voltage of second capacitor 50d. Also, first switch 41d, second switch 42d, and fourth switch 44d are turned off, but fourth switch 44d may be turned on as described above and shown in FIGS. 23 to 25.

Figure 24:
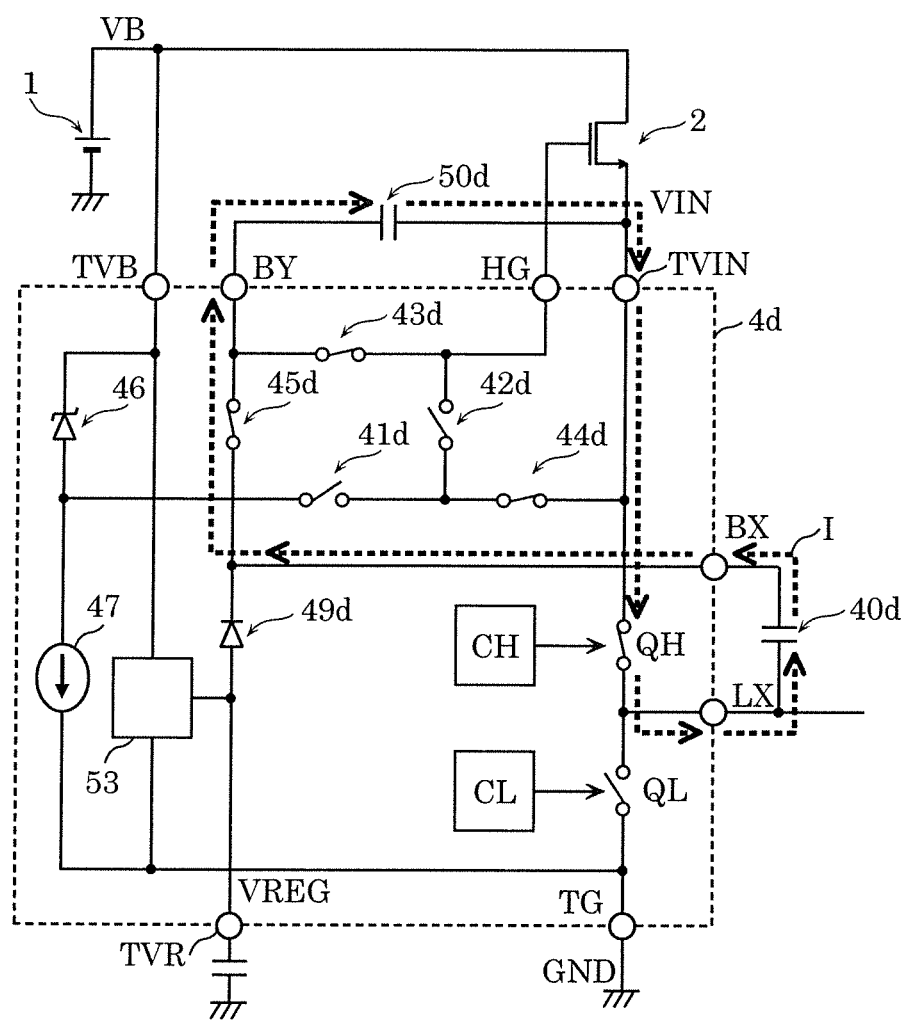
FIG. 24 is an operation of the power supply protection circuit according to Embodiment 4, in particular, a second normal operation of the Nch MOSFET.

Next, FIG. 24 is a diagram illustrating an operation of power supply protection circuit 10d according to Embodiment 4, in particular, a second normal operation performed in the case where protection switch 2 is a Nch MOSFET.

The second normal operation shown in FIG. 24 refers to the state in which, in the step-down converter, high side switch QH that performs switching operation is turned on, and low side switch QL is turned off. When second rectifier element 45d that is a switch is turned on, the electric charges of first capacitor 40d flow as indicated by dotted arrow I shown in FIG. 24, and stored in second capacitor 50d. Third switch 43d is turned on, and the voltage of second capacitor 50d is applied between the gate and the source of protection switch 2, and protection switch 2 is turned on. Also, first switch 41d, second switch 42d, and fourth switch 44d are turned off, but fourth switch 44d may be turned on as described above and shown in FIGS. 23 to 25.

As described above, in power supply protection circuit 10d according to Embodiment 4, in the normal operation performed in the case where protection switch 2 is a Nch MOSFET, the first normal operation and the second normal operation that were described above are alternately repeated by the switching operation (normally set to 100 kHz to several MHz) of the step-down converter, as a result of which first capacitor 40d is charged by voltage VREG output by second power supply circuit 53 during the first normal operation, and second capacitor 50d is charged by the voltage of first capacitor 40d during the second normal operation. By doing so, a voltage that is substantially equal to VREG is constantly applied between the gate and the source of protection switch 2, and protection switch 2 is kept turned on, and power supply voltage VB is input to the step-down converter.

Figure 25:
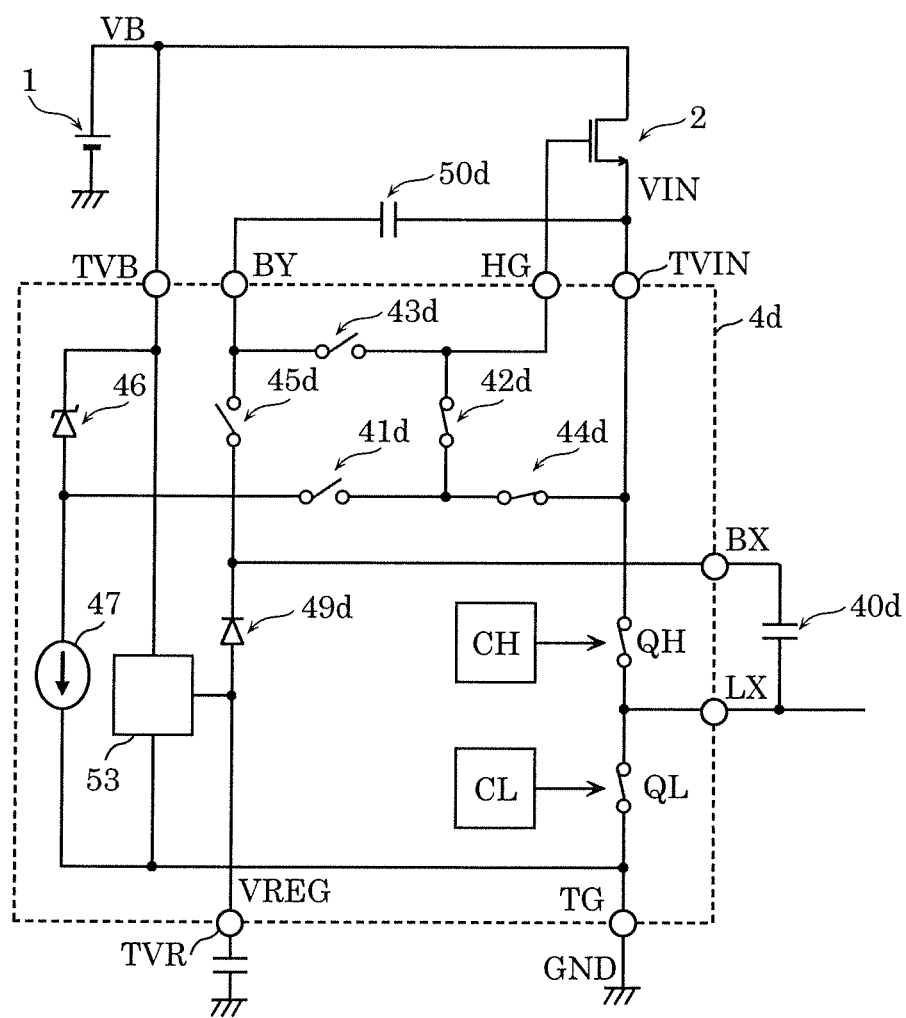
FIG. 25 is an operation of the power supply protection circuit according to Embodiment 4, in particular, a protection operation of the Nch MOSFET performed at the time of an anomaly.

FIG. 25 is a diagram illustrating an operation of power supply protection circuit 10d according to Embodiment 4, in particular, a protection operation performed at the time of an anomaly in the case where protection switch 2 is a Nch MOSFET.

The time of an anomaly refers to the state in which there is an anomaly in load circuit 3 or in the step-down converter, and FIG. 25 shows a ground fault state in which a ground fault has occurred on the output terminal of protection switch 2 due to high side switch QH and low side switch QL of the step-down converter being simultaneously turned on. If such an abnormal drop in terminal voltage VIN is detected, second switch 42d and fourth switch 44d are turned on, third switch 43d is turned off, and other switches are turned off, so as to short circuit the gate-source voltage of protection switch 2 and turn off protection switch 2. By doing so, direct current power supply 1 is protected from the anomalous state on the load side that includes the step-down converter.

Next, the operations of power supply protection circuit 10b performed when circuitry 4d is in the first state will be described with reference to FIGS. 26 and 27. Here, an operation of power supply protection circuit 10d according to Embodiment 4 in the case where protection switch 2 is a Pch MOSFET will be described. In this case, it is unnecessary to provide first capacitor 40d and second capacitor 50d, and power supply terminal TVB, first terminal BX, and connection terminal BY of circuitry 4d are connected. First terminal BX or connection terminal BY is maintained at power supply voltage VB, and thus controller 5d determines that protection switch 2 is a Pch MOSFET. Second rectifier element 45d and fourth switch 44d are turned off. In order to save power, second power supply circuit 53 may stop operating. Also, in voltage supply 46 that constitutes the first power supply circuit, a voltage that is equivalent to driving voltage VT is generated.

Figure 26:
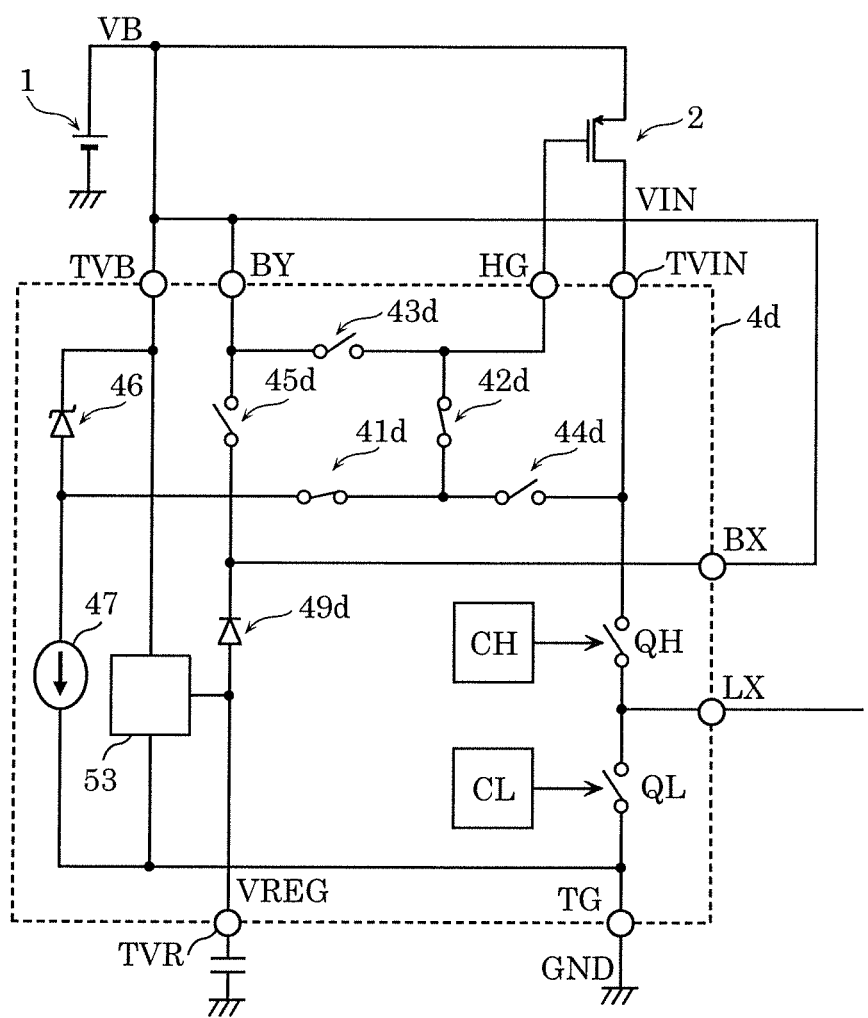
FIG. 26 is an operation of the power supply protection circuit according to Embodiment 4, in particular, a normal operation of a Pch MOSFET.

FIG. 26 is a diagram illustrating an operation of power supply protection circuit 10d according to Embodiment 4, in particular, a normal operation performed in the case where protection switch 2 is a Pch MOSFET.

In the normal operation shown in FIG. 26, first switch 41d and second switch 42d are turned on, and third switch 43d is turned off. As a result, a voltage that is lower than output voltage VIN, which is the source voltage, by an amount corresponding to driving voltage VT (second driving voltage) is applied to the gate of protection switch 2, and thus protection switch 2 is turned on, and power supply voltage VB is input to the step-down converter.

Figure 27:
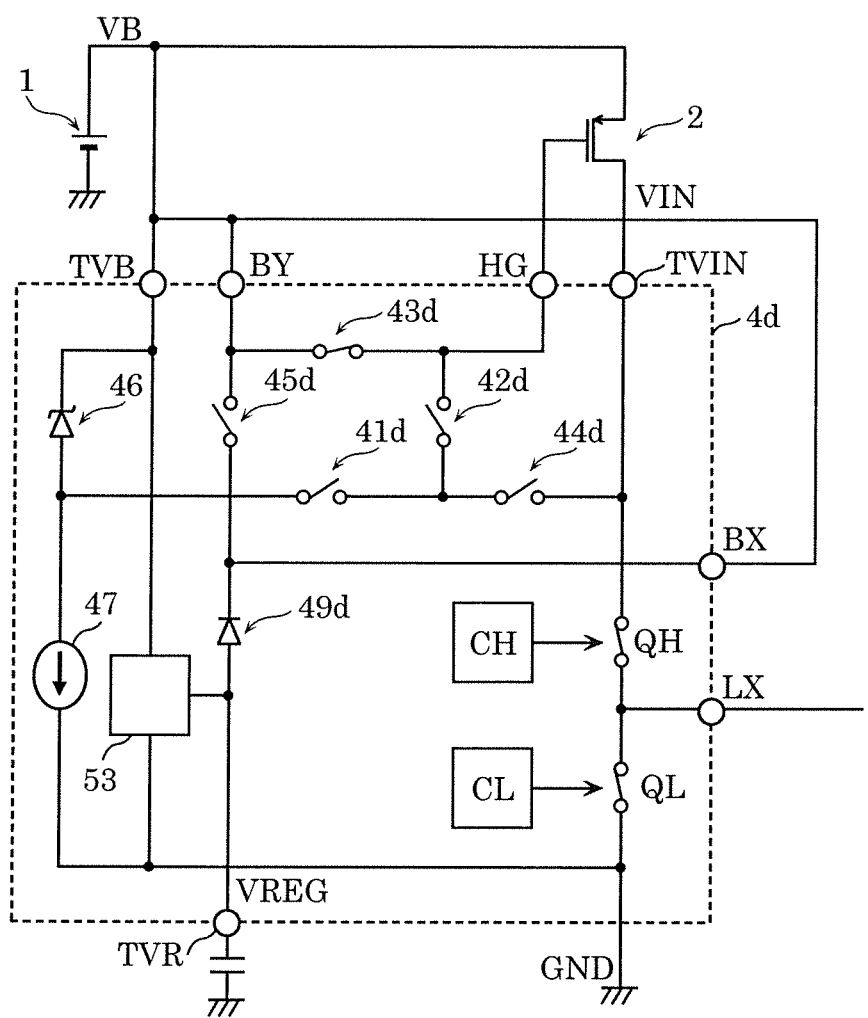
FIG. 27 is an operation of the power supply protection circuit according to Embodiment 4, in particular, a protection operation of the Pch MOSFET performed at the time of an anomaly.

FIG. 27 is a diagram illustrating an operation of power supply protection circuit 10d according to Embodiment 4, in particular, a protection operation performed at the time of an anomaly in the case where protection switch 2 is a Pch MOSFET.

FIG. 27 shows a protection operation performed at the time of an anomaly such as, for example, a ground fault state in which a ground fault has occurred on the output terminal of protection switch 2 caused by high side switch QH and low side switch QL of the step-down converter being simultaneously turned on. If such an abnormal drop in the voltage of the output terminal of protection switch 2 is detected, controller 5d turns off first switch 41d and second switch 42d, and turns on third switch 43d. By doing so, the gate and the source of protection switch 2 are short circuited, and thus protection switch 2 is turned off. As a result, direct current power supply 1 is protected from the anomalous state on the load side that includes the step-down converter. At this time, in order to save power, current supply 47 may stop operating.

As described above, in power supply protection circuit 10d according to Embodiment 4, a step-down converter is provided on the input side of load circuit 3, or in other words, in the output terminal of protection switch 2. In the case where protection switch 2 is a Nch MOSFET, a driving voltage can be supplied to protection switch 2 by using the switching operation of the step-down converter, and thus it is unnecessary to generate a driving pulse in controller 5d of power supply protection circuit 10d.

Also, in the case where protection switch 2 is a Pch MOSFET, it is unnecessary to provide a bootstrap circuit that is required to drive a Nch MOSFET. Accordingly, by connecting first terminal BX, to which first capacitor 40d of the bootstrap circuit is connected, to power supply terminal TVB, it is possible to determine whether protection switch 2 is a Pch MOSFET or a Nch MOSFET. Specifically, for example, if first voltage VBX of first terminal BX at the time of activation is power supply voltage VB, it is determined that protection switch 2 is a Pch MOSFET, and if first voltage VBX is a voltage that is lower than power supply voltage VB, it is determined that protection switch 2 is a Nch MOSFET.

In the description given above, first terminal BX of the bootstrap circuit is connected to power supply terminal TVB. However, the determination can be made even when first terminal BX is connected to GND. A circuit that is capable of determining that protection switch 2 is a Pch MOSFET if the voltage of first terminal BX is power supply voltage VB or GND, and determining that protection switch 2 is a Nch MOSFET if the voltage of first terminal BX is a substantially intermediate voltage between GND and VB may have the same configuration as that of decision circuit 60 of Embodiment 1. Decision circuit 60 includes a circuit that detects an anomaly in load circuit 3, and is therefore also applicable to Embodiment 4 to make the determination. The operations of the switches according to the output of decision circuit 60 are different from those of Embodiment 1.

Figures 28A, 28B:
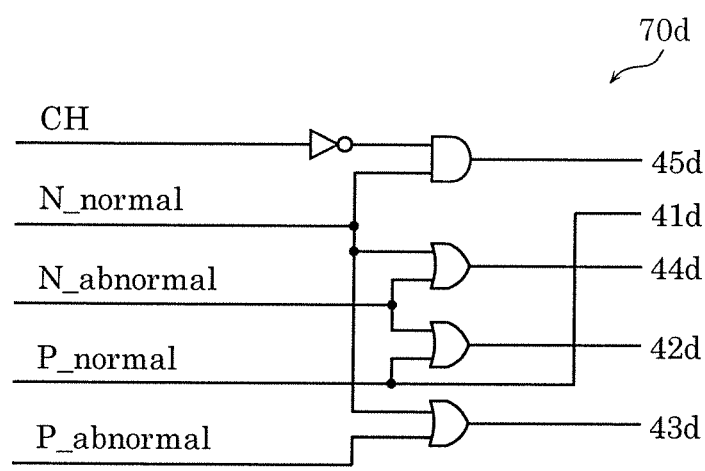
FIG. 28A is a circuit diagram showing a configuration of a driving logic of a controller according to Embodiment 4.
FIG. 28B is a table showing the states of the operations of first to fourth switches and a second rectifier element according to Embodiment 4.

Next, a configuration of controller 5d will be described with reference to FIGS. 28A and 28B. FIG. 28A is a circuit diagram that shows a configuration of driving logic 70d of controller 5d according to Embodiment 4. FIG. 28B is a table showing the states of the operations of first switch 41d, second switch 42d, third switch 43d, fourth switch 44d, and second rectifier element 45d according to Embodiment 4. Controller 5d according to Embodiment 4 includes driving logic 70d as shown in FIG. 28A in place of driving logic 70a of controller 5a according to Embodiment 1. Although a detailed description is omitted here, the states of the switches as shown in FIG. 28B are obtained by a logic circuit as shown in FIG. 28A.

As described above, even with power supply protection circuit 10d according to Embodiment 4, the same advantageous effects as those of power supply protection circuit 10a according to Embodiment 1 can be obtained.

Embodiment 5

A power supply protection circuit according to Embodiment 5 will be described with reference to the drawings, focusing on the differences from the power supply protection circuits of the above-described embodiments.

In the power supply protection circuit according to Embodiment 5, the controller includes a comparator that compares the potential of the output terminal of protection switch 2 with a predetermined potential, and a monitor circuit that checks whether or not the comparator is in a proper operation state before activation of the power supply protection circuit, and forcibly renders protection switch 2 conductive for a predetermined length of time at the time of activation.

Figure 29:
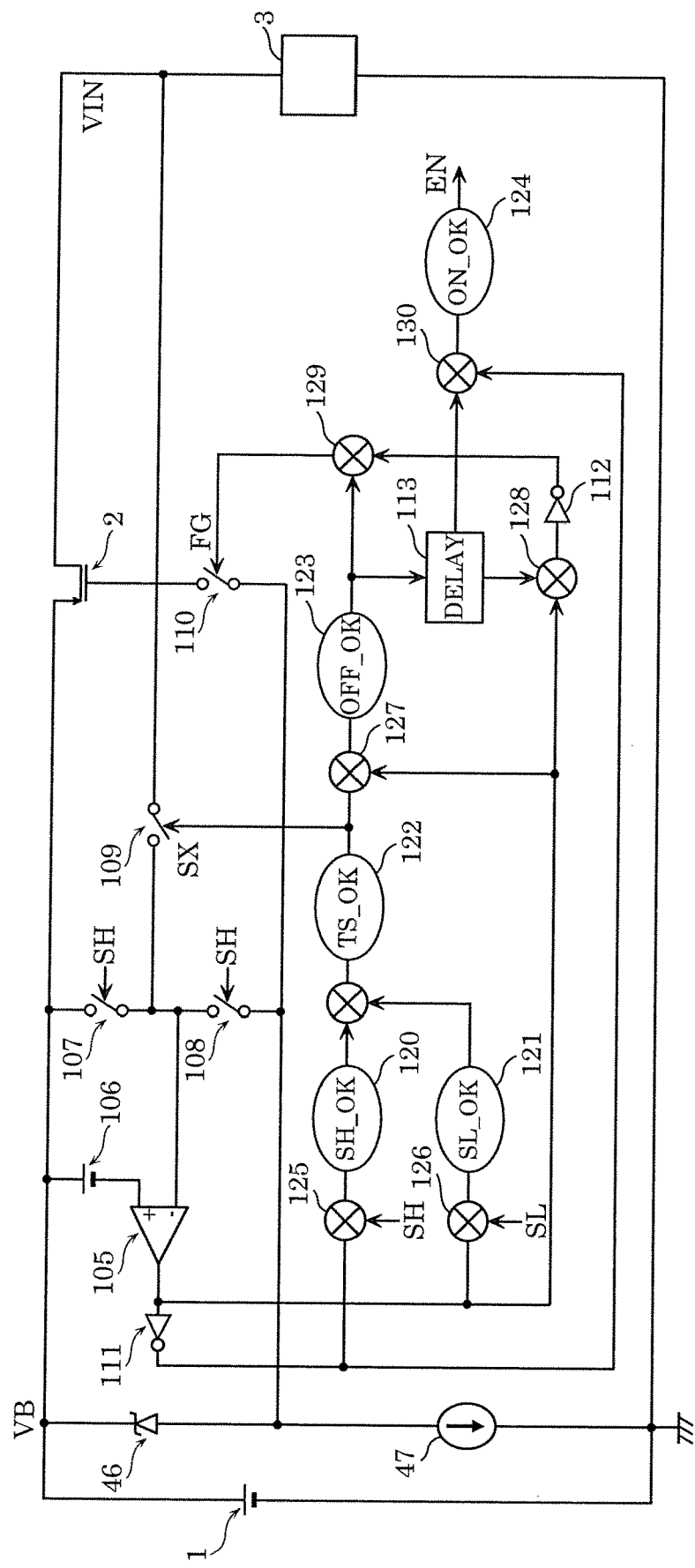
FIG. 29 is an overall circuit diagram of a power supply protection circuit according to Embodiment 5, the diagram illustrating a test mode operation of the power supply protection circuit at the time of activation.
Figure 30:
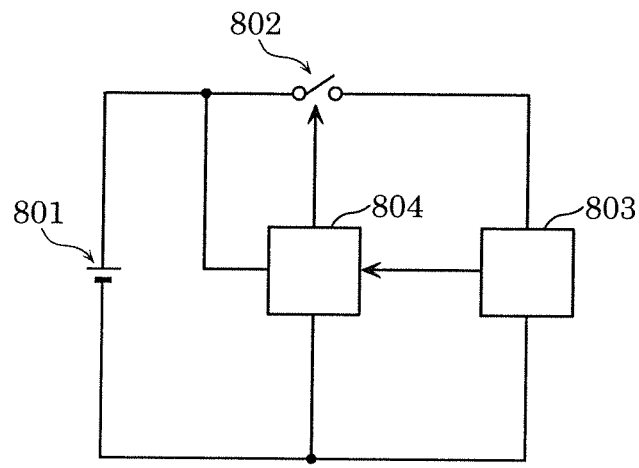
FIG. 30 is a circuit diagram showing a schematic configuration of a power supply protection circuit according to a conventional technique.
Figure 31:
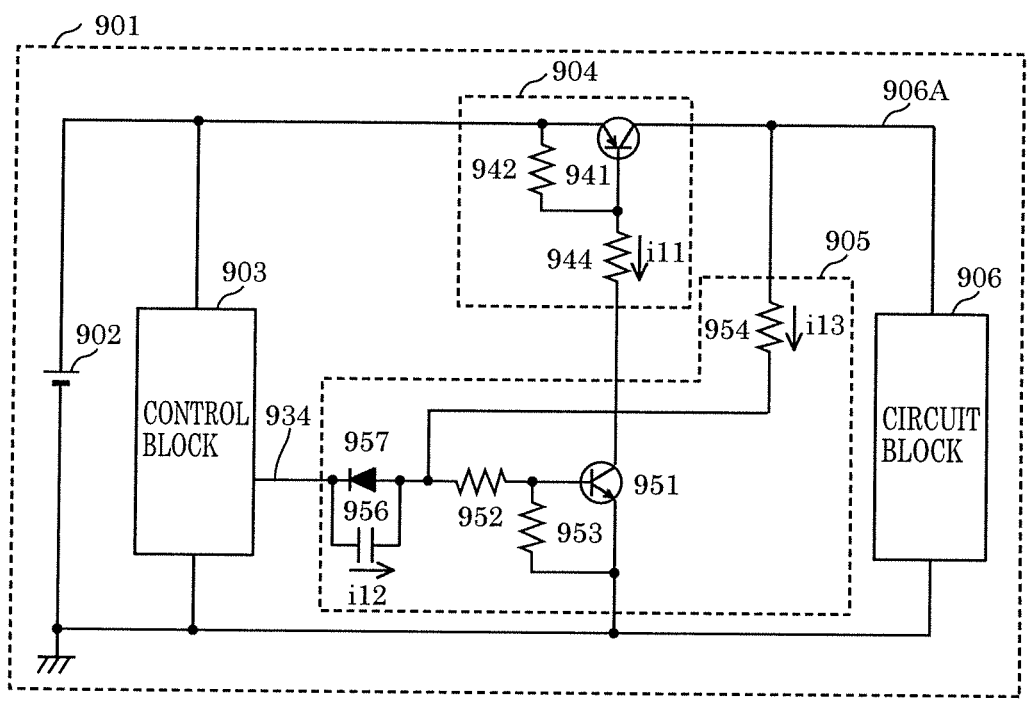
FIG. 31 is a circuit diagram showing a configuration of a power supply protection circuit according to a conventional technique disclosed in Japanese Unexamined Patent Application Publication No. H6-86460.

FIG. 29 is an overall circuit diagram of the power supply protection circuit according to Embodiment 5, the diagram illustrating a test mode operation of the power supply protection circuit at the time of activation.

As shown in FIG. 29, the power supply protection circuit is a circuit that controls protection switch 2 provided on a power supply line connecting direct current power supply 1 and load circuit 3. The power supply protection circuit includes voltage supply 46, current supply 47, monitor comparator 105, threshold voltage generator 106, switches 107 to 110, inverters 111 and 112, delay time generator 113, state latch circuits 120 to 124, and multipliers 125 to 130.

Monitor comparator 105 is an example of a comparator that compares the potential of the output terminal of protection switch 2 with a predetermined potential.

Also, the monitor circuit according to the present embodiment is a circuit as shown in FIG. 29 that includes threshold voltage generator 106, switches 107 to 110, inverters 111 and 112, delay time generator 113, state latch circuits 120 to 124, and multipliers 125 to 130.

Also, in the case where an anomalous state is determined by detecting a drop in voltage VIN of the output terminal of protection switch 2, it is necessary to prevent a situation in which a low VIM state in which voltage VIN is low at the time of activation (when voltage VIN rises from VIN=0 before activation) is determined as an anomalous state. Accordingly, in FIG. 29, before activation in which protection switch 2 is turned off, monitor comparator 105 and protection switch 2 are subjected to tests with respect to voltage VIN. If the test results are normal, protection switch 2 is turned on for a predetermined length of time set by delay time generator 113.

Next, the test performed on monitor comparator 105 will be described.

First, as the test performed on monitor comparator 105 at the time of activation, SH check (H detection) is performed in which when switch 107 is turned on, and a L level signal that indicates that the output of monitor comparator 105 is a normal value is output, inverter 111 outputs a H level signal, multiplier 125 outputs a result of multiplication that indicates a H level, and state latch circuit 120 latches at SH_OK=H. Also, SL check (L detection) is performed in which when switch 108 is turned on, and a H level signal that indicates that the output of monitor comparator 105 is a normal value is output, multiplier 126 outputs a H level signal, and state latch circuit 121 latches at SL_OK=H. Also, during checking monitor comparator 105, if the result of detection of the H level signal of monitor comparator 105 and the result of detection of the L level signal of monitor comparator 105 are normal, SH_OK=H and SL_OK=H are obtained, and state latch circuit 122 latches at TS_OK=H.

Also, the test performed on protection switch 2 will be described.

First, in OFF check (in which the OFF state of protection switch 2 is checked), if monitor comparator 105 is in a normal operation, SX=H is obtained, and the input of monitor comparator 105 is connected to the output terminal of protection switch 2. Because protection switch 2 is turned off, voltage VIN of the output terminal of protection switch 2 is L level. When a H level signal that indicates that the output of monitor comparator 105 is a normal value is output, multiplier 127 outputs a H level signal, and state latch circuit 123 latches at OFF_OK=H. Also, in ON check (in which the ON state of protection switch 2 is checked), after state latch circuit 123 has latched at OFF_OK=H, because the output of delay time generator 113 is L level during the delay time, multiplier 128 outputs a L level signal, and inverter 112 outputs a H level signal, multiplier 129 outputs a H level signal, and thus switch 110 is turned on. Accordingly, during the delay time of delay time generator 113, protection switch 2 is also forcibly turned on. The delay time of delay time generator 113 is set to be longer than the rise time of voltage VIN of the output terminal of protection switch 2.

After the delay time has elapsed, when voltage VIN of the output terminal of protection switch 2 normally rises, with the L level signal that indicates that the output of monitor comparator 105 is a normal value (the output of inverter 111 is a H level signal), the output of multiplier 130 changes to H level, and state latch circuit 124 outputs ON_OK=H. Also, in normal operations, delay time generator 113 outputs a H level signal, and the output of monitor comparator 105 is reflected to the output of multiplier 128. That is, if voltage VIN of the output terminal of protection switch 2 is higher than a predetermined value, protection switch 2 is turned on. If voltage VIN is lower than the predetermined value, protection switch 2 is turned off.

With the configuration described above, whether or not protection switch 2 and monitor comparator 105 are in a normal operation state can be tested. The controller according to Embodiment 4 is applicable to any of the controllers of the embodiments given above.

Variations, Etc.

The power supply protection circuit according to the present disclosure has been described by way of embodiments, but the present disclosure is not limited to the embodiments given above.

For example, Embodiments 1 to 4 have been described assuming that protection switch 2 is a Nch MOSFET or a Pch MOSFET, but the present disclosure is not limited thereto. For example, the protection switch may be a NPN-type bipolar transistor or a PNP-type bipolar transistor. However, in the embodiments given above, a driving voltage is generated and applied to MOSFET in order to turn on MOSFET, but in the case where the protection switch is a bipolar transistor, it is necessary to supply a base current. Accordingly, in the case where a bipolar transistor is used as protection switch 2, it is necessary to change the circuitry such that a driving voltage as described in Embodiments 1 to 4 is applied to a resistor so as to supply a base current from the resistor to a base terminal of the bipolar transistor.

The present disclosure also encompasses embodiments obtained by making various modifications that can be conceived by a person having ordinary skill in the art to the above embodiments as well as embodiments implemented by any combination of the structural elements and the functions of the embodiments and variations described above without departing from the scope of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The power supply protection circuit according to the present disclosure is industrially useful, in particular as an on-vehicle power supply protection circuit that can exhibit high performance.

What is claimed is:

1. A power supply protection circuit that controls a protection switch provided on a power supply line connecting a direct current power supply and a load circuit, the power supply protection circuit comprising:
    circuitry connected to the protection switch; and
    a controller that switches an operation state of the circuitry between a first state and a second state,
    wherein the first state is an operation state in which driving of the protection switch into a conductive state and a non-conductive state is enabled when the protection switch is a first semiconductor switch having a control terminal connected to a semiconductor layer of a first conductivity type, and
    the second state is an operation state in which driving of the protection switch into a conductive state and a non-conductive state is enabled when the protection switch is a second semiconductor switch having a control terminal connected to a semiconductor layer of a second conductivity type that is different from the semiconductor layer of a first conductivity type.

2. The power supply protection circuit according to claim 1,
    wherein the circuitry includes a first power supply circuit that generates a first potential that is lower than a power supply voltage of the direct current power supply by an amount corresponding to a first driving voltage for driving the first semiconductor switch,
    the circuitry includes:
    a first driving circuit that applies the first potential to the control terminal of the protection switch in the first state; and
    a second driving circuit that applies a second driving voltage for driving the second semiconductor switch between the control terminal of the protection switch and a connection point between the protection switch and the load circuit in the second state.

3. The power supply protection circuit according to claim 1,
    wherein the circuitry includes:
    a series circuit that includes a high side switch and a low side switch that are alternately turned on and off at a predetermined cycle,
    the high side switch is connected to an output terminal of the protection switch, the circuitry includes:
    in the first state,
    a first power supply circuit that generates a first potential that is lower than a power supply voltage of the direct current power supply by an amount corresponding to a first driving voltage for driving the first semiconductor switch; and a first driving circuit that applies the first potential to the control terminal of the protection switch, in the second state, a second power supply circuit that generates a second potential that is higher than a ground potential by an amount corresponding to a second driving voltage for driving the second semiconductor switch by using the power supply voltage of the direct current power supply; and a second driving circuit that applies the second driving voltage between the control terminal and the output terminal of the protection switch.

4. The power supply protection circuit according to claim 3, wherein the second driving circuit includes:

a first bootstrap circuit that includes a series circuit that includes a first capacitor and a first rectifier element, the series circuit being connected between the second power supply circuit and a connection point between the high side switch and the low side switch, the first bootstrap circuit applying the second driving voltage to the first capacitor via the first rectifier element from the second power supply circuit when the low side switch is turned on; and a second bootstrap circuit that includes a series circuit that includes a second capacitor and a second rectifier element, the series circuit being connected between the first capacitor and the output terminal of the protection switch, the second bootstrap circuit applying the second driving voltage to the second capacitor via the second rectifier element from the first capacitor when the high side switch is turned on.

5. The power supply protection circuit according to claim 3, wherein the first power supply circuit includes a series circuit that includes a voltage supply and a current supply, the series circuit being connected to the direct current power supply, the first driving circuit includes:

a series circuit that includes a first switch and a second switch, the series circuit being connected between the control terminal of the protection switch and a connection point between the voltage supply and the current supply;

a third switch whose one terminal is connected to the control terminal of the protection switch;

a connection terminal to which another terminal of the third switch is connected, and a fourth switch that is connected between the output terminal of the protection switch and a connection point between the first switch and the second switch, and the connection terminal is connected to the direct current power supply.

6. The power supply protection circuit according to claim 5, wherein the controller turns off the fourth switch, in a normal operation, the controller turns on the first switch and the second switch, and turns off the third switch so as to render the protection switch conductive, and at the time of an anomaly, the controller turns off the first switch and the second switch, and turns on the third switch so as to shut down the protection switch.

7. The power supply protection circuit according to claim 4, wherein the first power supply circuit includes a series circuit that includes a voltage supply and a current supply, the series circuit being connected to the direct current power supply, the first driving circuit includes:

a series circuit that includes a first switch and a second switch, the series circuit being connected between the control terminal of the protection switch and a connection point between the voltage supply and the current supply;

a third switch whose one terminal is connected to the control terminal of the protection switch;

a connection terminal to which another terminal of the third switch is connected; and a fourth switch that is connected between the output terminal of the protection switch and a connection point between the first switch and the second switch, and the second capacitor is connected between the connection terminal and the output terminal of the protection switch.

8. The power supply protection circuit according to claim 7, wherein the controller turns off the first switch, and turns on the fourth switch, in a normal operation, the controller turns off the second switch, and turns on the third switch so as to render the protection switch conductive, and at the time of an anomaly, the controller turns on the second switch, and turns off the third switch so as to shut down the protection switch.

9. The power supply protection circuit according to claim 2, wherein the first power supply circuit includes a series circuit that includes a voltage supply and a current supply, the series circuit being connected to the direct current power supply, the first driving circuit includes:

a first switch that is connected between the control terminal of the protection switch and a connection point between the voltage supply and the current supply; and a second switch that is connected between the direct current power supply and the control terminal of the protection switch, and the second driving circuit includes:

a series circuit that includes a first capacitor and a third switch, the series circuit being connected in parallel to the first switch;

a fourth switch that is connected between the output terminal of the protection switch and a connection point between the first capacitor and the third switch; and a fifth switch that is connected between the control terminal and the output terminal of the protection switch.

10. The power supply protection circuit according to claim 9, wherein, when the circuitry is in the second state, in a normal operation, the controller turns off the first switch and the fifth switch, simultaneously turns on or off the second switch and the third switch at a predetermined cycle, and alternately turns on or off the fourth switch and the second switch so as to turn on or off the protection switch, and at the time of an anomaly, the controller turns off the first switch, the second switch, and the third switch, and turns on the fourth switch and the fifth switch so as to shut down the protection switch.

11. The power supply protection circuit according to claim 9,
wherein, when the circuitry is in the first state,
in a normal operation, the controller turns on the first switch, and turns off the second switch, the third switch, the fourth switch, and the fifth switch so as to render the protection switch conductive, and
at the time of an anomaly, the controller turns on the second switch, and turns off the first switch, the third switch, the fourth switch, and the fifth switch so as to shut down the protection switch.

12. The power supply protection circuit according to claim 2,
wherein the first power supply circuit includes a series circuit that includes a voltage supply and a current supply, the series circuit being connected to the direct current power supply,
the first driving circuit includes:
a first switch that is connected between the control terminal of the protection switch and a connection point between the voltage supply and the current supply; and
a series circuit that includes a second switch and a third switch, the series circuit being connected between the direct current power supply and the control terminal of the protection switch, and
the second driving circuit includes:
the second switch that is also used in the first driving circuit;
a series circuit that includes a fourth switch and a fifth switch, the series circuit being connected between the protection switch and the connection point between the voltage supply and the current supply;
a first capacitor that is connected between a connection point between the second switch and the third switch and a connection point between the fourth switch and the fifth switch; and
a discharge resistor that is connected between the control terminal and an output terminal of the protection switch.

13. The power supply protection circuit according to claim 12,
wherein, when the circuitry is in the first state,
the controller turns on the second switch, and turns off at least one of the fourth switch and the fifth switch,
in a normal operation, the controller turns on the first switch, and turns off the third switch so as to render the protection switch conductive,
at the time of an anomaly, the controller turns on the third switch, and turns off the first switch so as to shut down the protection switch,
when the circuitry is in the second state,
the controller turns off the first switch,
in a normal operation, the controller simultaneously turns on or off the second switch and the fourth switch at a predetermined cycle, and turns on or off the third switch and the fifth switch alternately with the second switch so as to render the protection switch conductive,
at the time of an anomaly, the controller turns on the second switch and the fourth switch, and turns off the third switch and the fifth switch so as to shut down the protection switch.

14. The power supply protection circuit according to claim 2,
wherein the first power supply circuit includes a series circuit that includes a first switch, a voltage supply, and a current supply, the series circuit being connected to the direct current power supply,
the first driving circuit includes:
a series circuit that includes a second switch and a third switch, the series circuit being connected between the control terminal of the protection switch and a connection point between the first switch and the voltage supply;
a first terminal that is a connection point between the second switch and the third switch; and
a second terminal that is a connection point between the voltage supply and the current supply, and
the second driving circuit includes:
the second switch that is also used in the first driving circuit;
a first capacitor that is connected between the first terminal and an output terminal of the protection switch;
a fourth switch that is connected between the output terminal of the protection switch and the connection point between the voltage supply and the current supply; and
a fifth switch that is connected between the control terminal and the output terminal of the protection switch.

15. The power supply protection circuit according to claim 14,
wherein, when the circuitry is in the first state,
the controller turns on the first switch and the third switch, and turns off the fourth switch and the fifth switch,
in a normal operation, the controller turns off the second switch so as to render the protection switch conductive, and
at the time of an anomaly, the controller turns on the second switch so as to shut down the protection switch, and
when the circuitry is in the second state,
in a normal operation, the controller turns on or off the first switch at a predetermined cycle, turns on or off the second switch and the fourth switch alternately with the first switch, turns on the third switch, and turn off the fifth switch so as to render the protection switch conductive, and
at the time of an anomaly, the controller turns on the fifth switch, and turns off the second switch, the third switch, and the fourth switch so as to shut down the protection switch.

16. The power supply protection circuit according to claim 1,
wherein the controller includes:
a comparator that compares a potential of an output terminal of the protection switch with a predetermined potential; and
a monitor circuit that checks whether or not the comparator is in a proper operation state before activation of the power supply protection circuit, and forcibly renders the protection switch conductive for a predetermined length of time at the time of activation.

* * * * *